United States Patent
Fyffe et al.

(10) Patent No.: US 10,151,848 B2
(45) Date of Patent: *Dec. 11, 2018

(54) HELICAL CONVEYOR FOR UNDERWATER SEISMIC EXPLORATION

(71) Applicant: Fairfield Industries, Inc., Sugar Land, TX (US)

(72) Inventors: Roger L. Fyffe, Sugar Land, TX (US); Etienne Marc, Houston, TX (US)

(73) Assignee: Fairfield Industries, Inc., Houston, TX (US)

(*) Notice: Subject to any disclaimer, the term of this patent is extended or adjusted under 35 U.S.C. 154(b) by 182 days.

This patent is subject to a terminal disclaimer.

(21) Appl. No.: 15/088,060

(22) Filed: Mar. 31, 2016

(65) Prior Publication Data

US 2017/0283180 A1    Oct. 5, 2017

(51) Int. Cl.
| | | |
|---|---|---|
| *G01V 1/38* | (2006.01) | |
| *B65G 33/02* | (2006.01) | |
| *B65G 67/60* | (2006.01) | |

(52) U.S. Cl.
CPC ............ *G01V 1/3852* (2013.01); *B65G 33/02* (2013.01); *B65G 67/603* (2013.01); *G01V 1/3808* (2013.01)

(58) Field of Classification Search
CPC ...... G01V 1/38; G01V 1/3808; G01V 1/3852; B63C 11/52; B65G 33/02; B65G 67/603
USPC ................................ 367/15, 188; 405/158
See application file for complete search history.

(56) References Cited

U.S. PATENT DOCUMENTS

| | | |
|---|---|---|
| 4,905,404 A | 3/1990 | Pasion et al. |
| 5,253,223 A | 10/1993 | Svenning et al. |
| 5,271,953 A | 12/1993 | Litteral |
| 5,442,590 A | 8/1995 | Svenning et al. |
| 5,811,055 A | 9/1998 | Geiger |
| 6,273,771 B1 | 8/2001 | Buckley et al. |
| 6,350,085 B1 | 2/2002 | Bath et al. |
| 6,371,693 B1 | 4/2002 | Kopp et al. |
| 6,456,565 B1 | 9/2002 | Grall et al. |
| 6,474,254 B1 | 11/2002 | Ambs et al. |
| 6,588,980 B2 | 7/2003 | Worman et al. |
| 6,612,397 B2 | 9/2003 | Sparrevik et al. |

(Continued)

FOREIGN PATENT DOCUMENTS

| | | |
|---|---|---|
| WO | WO-01/73477 A2 | 10/2001 |
| WO | WO-02/46793 A1 | 6/2002 |
| WO | WO-2016/066719 | 5/2016 |

OTHER PUBLICATIONS

Final Office Action issued in U.S. Appl. No. 12/343,136, dated Apr. 25, 2011, 8 pages.

(Continued)

*Primary Examiner* — Ian J Lobo
(74) *Attorney, Agent, or Firm* — Foley & Lardner LLP; James De Vellis

(57) ABSTRACT

The present disclosure is directed to a helical conveyor for underwater seismic exploration. The system can include a case having a cylindrical portion. A cap is positioned adjacent to a first end of the case. A conveyor having a helix structure is provided within the case. The conveyor can receive an ocean bottom seismometer ("OBS") unit at a first end of the conveyer and transport the OBS unit via the helix structure to a second end of the conveyor to provide the OBS unit on the seabed to acquire the seismic data.

32 Claims, 24 Drawing Sheets

(56) References Cited

U.S. PATENT DOCUMENTS

| | | |
|---|---|---|
| 6,625,083 B2 | 9/2003 | Vandenbroucke |
| 6,657,921 B1 | 12/2003 | Ambs |
| 6,951,138 B1 | 10/2005 | Jones |
| 6,975,560 B2 | 12/2005 | Berg et al. |
| 6,992,951 B2 | 1/2006 | O'Brien et al. |
| 7,210,556 B2 | 5/2007 | Bath et al. |
| 7,254,093 B2 | 8/2007 | Ray et al. |
| 7,632,043 B2 | 12/2009 | Thompson et al. |
| 7,965,583 B2 | 6/2011 | Thomas |
| 8,021,080 B2 | 9/2011 | Frivik et al. |
| 8,127,706 B2 | 3/2012 | Thompson et al. |
| 8,310,899 B2 | 11/2012 | Woodard et al. |
| 8,534,959 B2 | 9/2013 | Thompson et al. |
| 8,556,540 B2 | 10/2013 | Thompson et al. |
| 8,579,545 B2 | 11/2013 | Jewell et al. |
| 8,611,181 B2 | 12/2013 | Woodward et al. |
| 9,010,431 B2 | 4/2015 | Billington et al. |
| 9,081,119 B2 | 7/2015 | Norris et al. |
| 9,096,106 B2 | 8/2015 | Hanson et al. |
| 9,645,271 B2 | 5/2017 | Woodward et al. |
| 2001/0028041 A1 | 10/2001 | Hubbard |
| 2002/0172562 A1 | 11/2002 | Worman et al. |
| 2003/0218937 A1 | 11/2003 | Berg et al. |
| 2004/0026346 A1 | 2/2004 | Kelly et al. |
| 2005/0052951 A1 | 3/2005 | Ray et al. |
| 2005/0155814 A1 | 7/2005 | Bath et al. |
| 2005/0276665 A1 | 12/2005 | Entralgo et al. |
| 2006/0120216 A1 | 6/2006 | Ray et al. |
| 2006/0159524 A1 | 7/2006 | Thompson et al. |
| 2006/0243189 A1 | 11/2006 | Thompson et al. |
| 2006/0286931 A1 | 12/2006 | Rhodes et al. |
| 2007/0070808 A1 | 3/2007 | Ray et al. |
| 2007/0248417 A1 | 10/2007 | Berg |
| 2007/0258774 A1 | 11/2007 | Thompson et al. |
| 2008/0041296 A1 | 2/2008 | Thompson et al. |
| 2008/0041298 A1 | 2/2008 | Lin |
| 2008/0049554 A1 | 2/2008 | Crice et al. |
| 2008/0144442 A1 | 6/2008 | Combee et al. |
| 2008/0279636 A1 | 11/2008 | Ray et al. |
| 2009/0037145 A1 | 2/2009 | Suzuki et al. |
| 2009/0052992 A1 | 2/2009 | Thompson et al. |
| 2009/0207697 A1 | 8/2009 | Kitchin et al. |
| 2011/0158040 A1 | 6/2011 | Kooper et al. |
| 2011/0217123 A1 | 9/2011 | Jewell et al. |
| 2013/0187787 A1* | 7/2013 | Damus .......... H04B 13/02 340/850 |
| 2013/0204456 A1 | 8/2013 | Tippelhofer et al. |
| 2014/0056108 A1 | 2/2014 | Chelminski |
| 2014/0153360 A1 | 6/2014 | Tonchia |
| 2015/0000582 A1 | 1/2015 | Lelaurin et al. |
| 2015/0049588 A1 | 2/2015 | Lambertus et al. |
| 2015/0151819 A1 | 6/2015 | Tjom |
| 2016/0103237 A1 | 4/2016 | Fjellstad et al. |
| 2016/0121983 A1 | 5/2016 | Rokkan et al. |
| 2017/0017007 A1 | 1/2017 | Woodward et al. |
| 2017/0137098 A1 | 5/2017 | Valsvik et al. |
| 2017/0285203 A1 | 10/2017 | Fyffe et al. |

OTHER PUBLICATIONS

Final Office Action issued in U.S. Appl. No. 14/106,489 dated Apr. 3, 2015.
International Preliminary Report on Patentability and Written Opinion of the International Searching Authority for Application No. PCT/US2009/069037, dated Jun. 29, 2011, 7 pages.
International Search Report and Written Opinion of the International Searching Authority for PCT/US2008/072469 dated Nov. 19, 2008, 7 pages.
International Search Report for PCT/US2009/069037, dated Aug. 5, 2010, 1 page.
Non-Final Office Action issued in U.S. Appl. No. 13/671,645 dated Jun. 3, 2013, 9 pages.
Non-Final Office Action issued in U.S. Appl. No. 12/343,136, dated Nov. 22, 2010, 7 pages.
Non-Final Office Action issued U.S. Appl. No. 14/106,489 dated Jul. 10, 2015.
Notice of Allowance issued in U.S. Appl. No. 12/343,136 dated Aug. 21, 2012.
Notice of Allowance issued in U.S. Appl. No. 13/671,645 dated Oct. 30, 2013.
Office Action issued in U.S. Appl. No. 13/790,284 dated Dec. 17, 2015.
Office Action issued in U.S. Appl. No. 14/106,489 dated Dec. 23, 2014.
Office Action issued in U.S. Appl. No. 14/106,478 dated Mar. 7, 2016.
Office Action issued in U.S. Appl. No. 14/106,489 dated Feb. 16, 2016.
Office Action issued in U.S. Appl. No. 14/106,489 dated Oct. 23, 2015.
Notice of Allowance for U.S. Appl. No. 13/790,284 dated Jun. 6, 2016.
Office Action for U.S. Appl. No. 14/106,489 dated May 13, 2016.
Office Action on U.S. Appl. No. 14/106,478 dated Sep. 27, 2016.
U.S. Notice of Allowance on U.S. Appl. No. 14/106,478 dated Jan. 30, 2017.
U.S. Office Action on U.S. Appl. No. 15/088,049 dated Mar. 6, 2017.
International Search Report and Written Opinion in PCT/US2017/025191, dated Jun. 16, 2017.
International Search Report and Written Opinion on PCT/US2017/025189, dated Jun. 28, 2017.
International Search Report and Written Opinion on PCT/US2017/025190 dated Apr. 28, 2017.
International Search Report and Written Opinion on PCT/US2017/025192, dated Jun. 21, 2017.
Notice of Allowance on U.S. Appl. No. 15/088,049 dated Jul. 19, 2017.
Notice of Allowance on U.S. Appl. No. 15/216,085 dated Aug. 10, 2017.
Notice of Allowance on U.S. Appl. No. 15/216,085 dated Dec. 21, 2017.
Office Action on U.S. Appl. No. 15/088,054 dated Nov. 17, 2017.
Office Action on U.S. Appl. No. 15/088,058 dated Dec. 26, 2017.
Office Action on U.S. Appl. No. 15/216,067 dated Jan. 17, 2018.
Office Action on U.S. Appl. No. 15/216,085 dated Jun. 13, 2017.
Office Action on U.S. Appl. No. 15/235,863 dated Jan. 25, 2018.

* cited by examiner

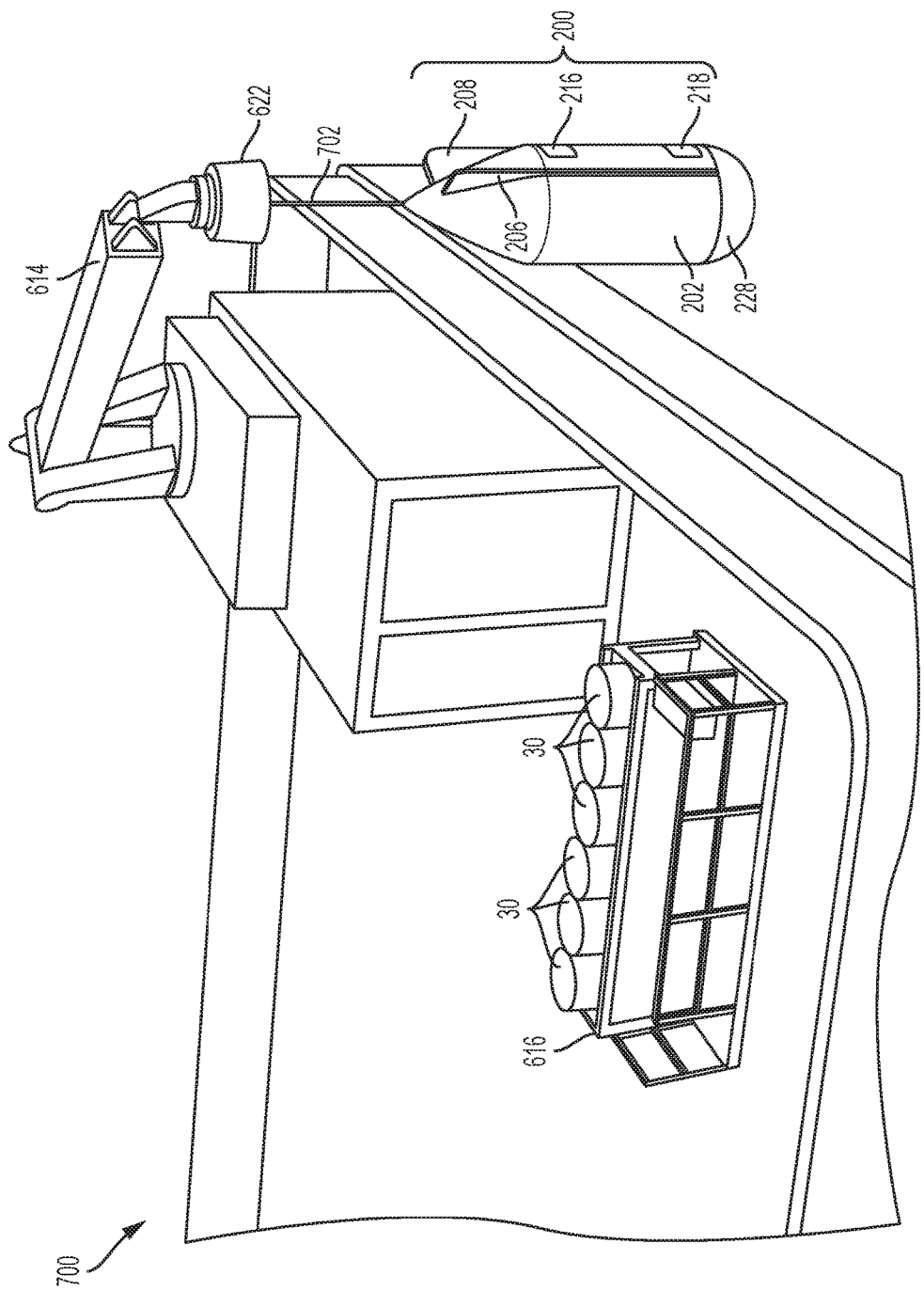

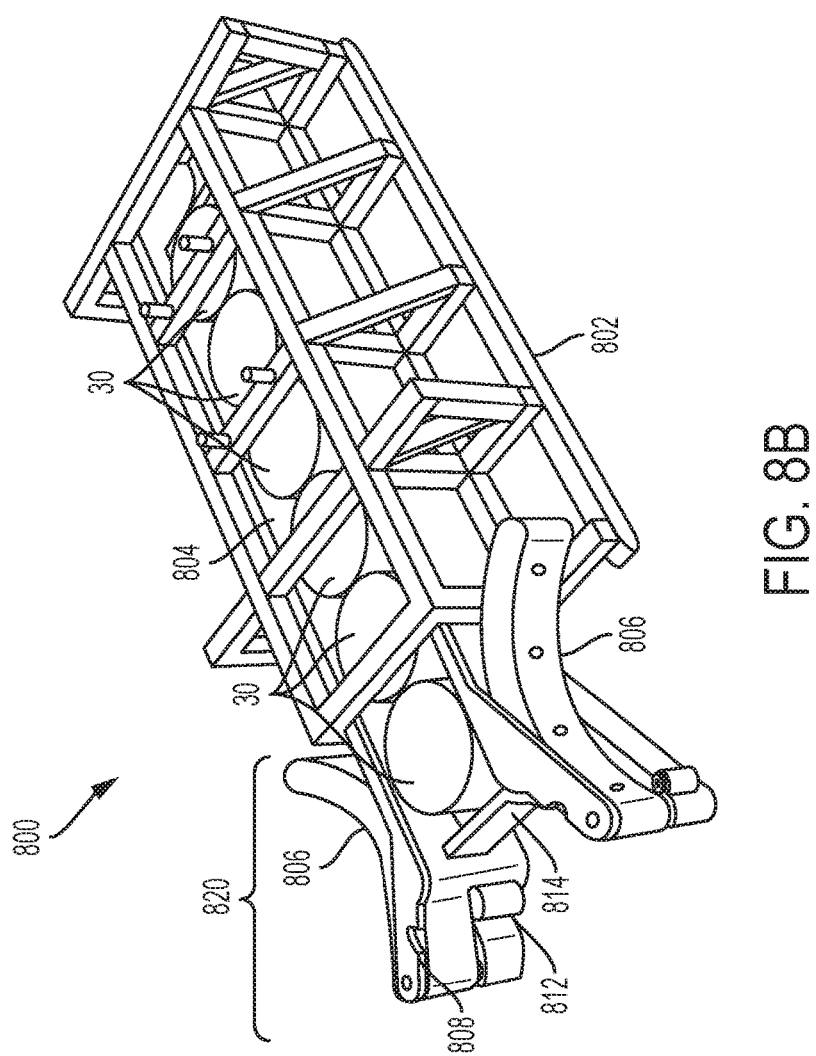

HELICAL CONVEYOR FOR UNDERWATER SEISMIC EXPLORATION

BACKGROUND

Seismic data may be evaluated to obtain information about subsurface features. The information can indicate geological profiles of a subsurface portion of earth, such as salt domes, bedrock, or stratigraphic traps, and can be interpreted to indicate a possible presence or absence of minerals, hydrocarbons, metals, or other elements or deposits.

SUMMARY

At least one aspect is directed to a system for acquiring seismic data from a seabed. The system includes a case having a cylindrical portion. The system includes a cap positioned adjacent to a first end of the case. The system includes a conveyor having a helix structure and provided within the case. The conveyor can receive an ocean bottom seismometer ("OBS") unit at a first end of the conveyer and transport the OBS unit via the helix structure to a second end of the conveyor. A first distance between the first end of the conveyor and the cap can be less than a second distance between the second end of the conveyor and the cap. The conveyor can facilitate providing the OBS unit on the seabed to acquire the seismic data.

The system can include one or more fins. For example, the system can include a first fin or a first fin and a second fin. The first fin can extend from at least one of the cap or the case. The second find can extend from at least one of the cap or the case. The first fin can be separated from the second fin by a predetermined angle to control rotation or spin of the case through an aqueous medium. The first and second fins can control rotation or spin or dampen rotation or spin by exerting force or creating and controlling the exerted force. The exerted force can control rotation, impact steering, provide operational stability when the case is being towed or at-rest. Dampening rotation can include or refer to reducing rotational force or rotation by 5%, 10%, 20%, 25%, 30% or more. Dampening rotation can refer to or include reducing the rate of rotation, or preventing a full rotation. The OBS unit can be attached to the seabed, positioned on the seabed, put in contact with the seabed, coupled to the seabed, or otherwise connected to the seabed. For example, the OBS unit can be sufficiently connected to the seabed to collect seismic data from or via the seabed.

The case can include one or more openings to allow the OBS unit to pass through the case. For example, the case can include a first opening to receive the OBS unit at the first end of the conveyor, and a second opening to remove the OBS unit from the second end of the conveyor. The case can include a first gate configured to close the first opening and a second gate configured to obstruct the second opening. At least one of the first gate or the second gate can be under mechanical tension, such as spring loaded or piston activated. At least one of the first gate or the second gate can be open and closed along a vertical axis of the cylindrical portion. For example, an underwater vehicle can be configured to open or close the first gate or the second gate.

The cap can include a conical shape. A base of the cap can be coupled to the first end of the case. The first fin and the second fin can be positioned to generate drag in the aqueous medium to control the rotation of the case. The first fin can separated from the second fin by the predetermined angle to dampen rotation of the case when moved through the aqueous medium. The predetermined angle between the first fin and the second fin can be between 70 and 110 degrees.

The center of the helix structure can extend along an axis of the cylindrical portion of the case. The conveyor can include one or a plurality of portions coupled together to form the helix structure. The portions can include, for example, ⅛ turn portions, ⅕ turn portions, ¼ turn portions, ⅓ turn portions, ½ turn portions, full turn portions, or other sized portion. The helix structure can include a spiral pitch, which can include or refer to a substantially constant pitch such as a pitch that varies from one of the conveyor to another end of the conveyor by less than plus or minus 0.5 degrees, 1 degree, 2 degrees, 3 degrees, 5 degrees, 10 degrees, 15 degrees, or 20 degrees.

The system can include a second conveyor having a second helix structure and provided within the case. The second conveyor can include a first end that is a third distance between the cap, where the third distance is greater than the first distance. The case can include one or more openings to allow one or more OBS units to pass through the case and onto at least one of the first conveyor or the second conveyor. The second conveyor can include a second end that is a fourth distance from the cap, where the fourth distance is greater than the second distance. The first helix structure and the second helix structure can have the same constant spiral pitch.

The system can include a second cap coupled to a second end of the case opposite from the first end. The second cap can include a ballast. The system can include a support structure provided in the case, such as a pole, column, pillar, grooves in the case, ribbing, walls of the case, cabling, or skid structure. The support structure can extend along an axis of the cylindrical portion of the case and through a center of the helix structure. The support structure can be coupled to at least one of a first interior portion of the cap or a second interior portion of a second cap. The support structure can support the conveyor.

The system can include a runner protruding from, and extending along, a longitudinal axis of the cylindrical portion of the case. The system can include a beacon positioned proximate to the first fin or the second fin. The beacon can include at least one of an acoustic transponder or a light source (e.g., yellow light, white light). The system can include other types of beacons such as wireless beacons, wired beacons, magnetic beacons, radio frequency beacons, motion beacons, or color-based beacons.

The conveyor can include an unpowered gravity conveyor. The conveyor can provide the OBS unit to an underwater vehicle. The underwater vehicle can include a capture appliance to receive the OBS unit via an opening at the second end of the conveyor. The underwater vehicle can include a deployment device to place the OBS unit on the seabed to acquire the seismic data.

At least one aspect is directed to a system for acquiring seismic data from a seabed. The system can include a case having a first portion that is hydrodynamic and a second portion to produce drag to dampen rotation of the case moved through an aqueous medium. The system can include a conveyor having a helix structure and provided within the case. The conveyor can be positioned to receive an OBS unit at a first end of the conveyer and transport the OBS unit via the helix structure to a second end of the conveyor.

The case can include one or more openings. The case can include a first opening configured to receive the OBS unit at the first end of the conveyor. The case can include a second opening to remove the OBS unit from the second end of the conveyor. The first opening and the cap can be separated by a first distance. The second opening and the cap can be separated by a second distance. The first distance can be less than the second distance. The conveyor can include a gravity conveyor that is unpowered.

At least one aspect is directed to a system for acquiring seismic data from a seabed. The system can include a case having a cylindrical portion. The system can include a cap positioned adjacent to a first end of the case. The system can include a conveyor having a helix structure and provided within the case. The conveyor can receive an OBS unit at a first end of the conveyer and transport the OBS unit via the helix structure to a second end of the conveyor. The system can include an underwater vehicle comprising a capture appliance to receive the OBS unit via an opening at the second end of the conveyor. The system can include a deployment device of the underwater vehicle to place the OBS unit on the seabed to acquire the seismic data.

The system can include a first fin extending from at least one of the cap or the case. The system can include a second fin extending from at least one of the cap or the case. The first fin can be separated from the second fin by a predetermined angle to control rotation of the case through an aqueous medium. The first fin and the second fin can be configured to generate drag in the aqueous medium to control the rotation of the case. The underwater vehicle can retrieve the OBS unit from the seabed.

At least one aspect is directed to a system for acquiring seismic data from a seabed. The system can include a case having a cylindrical portion and one or more openings. The system can include a cap positioned adjacent to a first end of the case. The system can include a first conveyor having a helix structure and provided within the case. The first conveyor can be configured to receive one or more OBS units at a first end of the first conveyer and transport the one or more OBS units via the helix structure to a second end of the first conveyor. The system can include an underwater vehicle comprising a retrieval device to retrieve an OBS unit connected to the seabed. The OBS unit can store seismic data acquired via the seabed. The underwater vehicle can include a second conveyor to transfer the OBS unit retrieved from the seabed to the first conveyor in the case via the one or more openings of the case.

The system can include a first fin extending from at least one of the cap or the case. The system can include a second fin extending from at least one of the cap or the case. The first fin can be separated from the second fin by a predetermined angle to control rotation of the case through an aqueous medium.

The system can include a third conveyor having a helix structure and provided within the case. The retrieval device can be configured to retrieve a second OBS unit connected to the seabed. The second conveyor can be configured to transfer the second OBS unit retrieved from the seabed to the third conveyor in the case via the one or more openings of the case.

At least one aspect is directed to a system to deploy OBS units. The system can include a case having a first portion to produce drag to dampen rotation of the case moved through an aqueous medium. The system can include a first conveyor provided within the case to support one or more OBS units. The first conveyor can have a helix structure. The case can include a first opening at a first end of the first conveyor, and a second opening at a second end of the first conveyor. The system can include a base to receive at least a portion of the case. The system can include a second conveyor positioned external to the case to support the one or more OBS units. The second conveyor can be constructed to move a first OBS unit of the one or more OBS units into the first opening at the first end of the first conveyor. The first conveyor can be constructed to receive the first OBS unit and direct the first OBS unit towards the second opening at the second end of the first conveyor.

The system can include an elevator configured to position the second conveyor to align the second conveyor with the first opening. The system can include a first gate configured to close the first opening. The second conveyor can be configured to open the first gate. The second conveyor can open the first gate to remove the first OBS unit from the helix structure.

The system can include a crane. The system can include a cable coupled to the crane and the case. The crane can raise, lower, or support the case via the cable. The crane can lower the case loaded with the one or more OBS units onto the seabed via the cable. The crane can lower the case loaded with the one or more OBS units into the aqueous medium. The system can include a fin extending from the case. The fin can be configured to create force as the case moves through the aqueous medium to dampen rotation of the case. The base can be configured to contact the seabed and support the case on the seabed.

In some embodiments, the helix structure can be referred to as a first helix structure and the one or more OBS units can be referred to as a first one or more OBS units. The system can include a third conveyor having a second helix structure provided within the case. The third conveyor can be configured to support a second one or more OBS units. The second one or more OBS units can be different from the first one or more OBS units. The second one or more OBS units can be mutually exclusive from the first one or more OBS units. The system can include a third opening of the case at a third end of the second conveyor. The system can include an elevator configured to raise or lower the second conveyor. The elevator can align the second conveyor with the first opening to load the first one or more OBS units onto the first conveyor via the first opening. The elevator can align the second conveyor with third opening to load the second one or more OBS units onto the third conveyor via the third opening. The first conveyor can be an unpowered gravity conveyor, and the second conveyor can be a powered conveyor.

At least one aspect is directed to a method for deploying OBS units. The method includes providing a case. The method includes providing a first conveyor within the case. The first conveyor can have a helix structure configured to support one or more OBS units. The case can include a first opening at a first end of the first conveyor and a second opening at a second end of the first conveyor. The method includes providing a base to hold the case in a substantially vertical position. The method includes providing a second conveyor positioned external to the case and configured to support the one or more OBS units. The method includes loading, by the second conveyor, a first OBS unit of the one or more OBS units into the case via the first opening at the first end of the first conveyor. The method includes directing, by the first conveyor, the first OBS unit received from the second conveyor towards the second opening at the second end of the first conveyor.

The case can include a first portion to produce drag to dampen rotation of the case moved through an aqueous medium. The method can include aligning, by an elevator, the second conveyor with the first opening. The method can include opening, by the second conveyor, a first gate closing the first opening. The method can include removing, by the second conveyor, the first OBS unit from the first conveyor.

The method can include a crane positioning the case into the aqueous medium. The crane can be coupled to the case via a cable. The method can include the crane positioning the case onto the seabed. The case can include the one or more OBS units. The method can include the crane positioning the case loaded with the one or more OBS units into the aqueous medium. The method can include a fin creating force as the case moves through the aqueous medium to dampen rotation of the case. The fin can extend from the case. The method can include the base contacting the seabed. The method can include the base supporting the case on the seabed.

In some embodiments, the helix structure is a first helix structure, and the one or more OBS units are a first one or more OBS units. The method can include providing, within the case, a third conveyor having a second helix structure. The method can include loading a second one or more OBS units onto the third conveyor.

At least one aspect of the present disclosure is directed to a system to acquire seismic data from a seabed. The system includes an underwater vehicle comprising a skid structure. The system includes a conveyor provided in the skid structure. The conveyor has a first end and a second end opposite the first end. The system includes a capture appliance provided at the first end of the conveyor. The capture appliance includes an arm to close to hold a case storing one or more OBS units. The capture appliance can open to release the case. The capture appliance can include an alignment mechanism to align an opening of the case with the first end of the conveyor. The system can include a deployment appliance at the second end of the conveyor to place an OBS unit of the one or more OBS units onto the seabed to acquire seismic data from the seabed.

The conveyor can include a belt or a plurality of rollers to move an OBS unit of the one or more OBS units from the first end of the conveyor to the second end of the conveyor. The arm can include one or more arms, such as a first arm and a second arm. The first arm can be coupled to a first portion of the conveyor. The second arm can be opposite from the first arm, and be coupled to a second portion of the conveyor. The first and second portions of the conveyor can be same or different portions of the conveyor. The first arm and the second arm can be operational to move from an open position to a closed position to capture the case. The first arm and the second arm can move from the closed position to the open position to release the case. For example, the first arm and the second arm can form, define, include, or otherwise provide a clamp.

The alignment mechanism can include a notch that can hold the case in a predetermined orientation. The notch can receive a protrusion extending along the case to hold the case in the predetermined orientation. The notch can include a tapered notch. The alignment mechanism can include a protrusion that holds the case in a predetermined orientation. The protrusion can be further configured to insert at least in part into a notch on the case to hold the case in the predetermined orientation.

The system can include a sensor configured to detect a signal received from the case. The signal can include at least one of an acoustic signal or a light signal. The ping can indicate a position of the underwater vehicle in an aqueous medium. The ping can indicate a depth of the underwater vehicle in the aqueous medium relative to the case. The underwater vehicle can include a remotely operated vehicle or an autonomously operated vehicle. The underwater vehicle can include a retrieval mechanism to retrieve the OBS unit of the one or more OBS units from the seabed. The OBS unit of the one or more OBS units can store, in memory, the seismic data acquired from the seabed.

The system can include a gate adjacent to the deployment appliance. The gate can be configured to open from a closed position to deploy the OBS unit of the one or more OBS units onto the seabed. The underwater vehicle can open or close the gate.

At least one aspect is directed to a system to acquire seismic data from a seabed. The system can include an underwater vehicle having a skid structure. The system can include a conveyor provided in the skid structure. The conveyor can have a first end and a second end opposite the first end. The system can include a capture appliance provided at the first end of the conveyor. The capture appliance including an arm to close to hold a case having one or more ocean bottom seismometer ("OBS") units on a helix structure in the case, and to open to release the case. The capture appliance includes an alignment mechanism to align an opening of the case with the first end of the conveyor. The conveyor can receive, via the opening of the case and from an end of the helix structure in the case, an OBS unit of the one or more OBS units. The system can include a deployment appliance located or positioned at or near the second end of the conveyor. The deployment appliance includes a ramp that places the OBS unit of the one or more OBS units onto the seabed to acquire seismic data from the seabed via the OBS unit of the one or more OBS units.

The conveyor can include a belt or a plurality of rollers to move the OBS unit of the one or more OBS units from a first end of the conveyor to a second end of the conveyor. A portion of the ramp can contact the seabed. The underwater vehicle can include a retrieval mechanism to retrieve the OBS unit of the one or more OBS units from the seabed. The OBS unit of the one or more OBS units can store, in memory, the seismic data acquired from the seabed.

At least one aspect is directed to a method for acquiring seismic data from a seabed. The method can include a sensor of an underwater vehicle identifying a case constructed to store one or more ocean bottom seismometer ("OBS") units. The underwater vehicle can include a conveyor and an arm. The method includes positioning the underwater vehicle so that the arm is in an open state above a cap of the case. The method includes closing, by an actuator of the underwater vehicle, the arm. The method includes moving, by the underwater vehicle, the arm toward a bottom portion of the case opposite the cap. An opening of the case can be aligned with the conveyor of the underwater vehicle. The method includes receiving, by the conveyor via the opening of the case, a first OBS unit of the one or more OBS units. The method includes placing, by the underwater vehicle, the first OBS unit on the seabed to acquire seismic data from the seabed.

The sensor can detect a ping from a transponder on the case. The underwater vehicle can use the ping to position the arm in the open state above the case. The underwater vehicle can determine a depth of the underwater vehicle relative to the case based on the ping. The underwater vehicle can move the arm in the open state towards a cable connected to the cap of the case that supports the case in an aqueous medium.

The case can include a first portion that is hydrodynamic and a second portion configured to produce drag to prevent rotation of the case through an aqueous medium. The case can include a portion having a conical shape, a domed shape, or a hydrodynamic shape. The method can include locking, in a notch of the arm, a runner of the case to align the opening of the case with the conveyor.

A gate on the case that blocks the first OBS unit from moving through the opening of the case can be mechanically opened. For example, the gate can be spring-loaded. The underwater vehicle can open the gate on the case. The underwater vehicle can run, initiate, start, operate, or other cause the conveyor to retrieve the first OBS unit from the case. The conveyor can receive, via the opening of the case, the first OBS unit from a helix structure in the case supporting the one or more OBS units. The conveyor can receive, via the opening of the case, a second OBS unit of the one or more OBS units. The second OBS unit can move down the helix structure towards the opening. The conveyor can receive, via the opening, a third OBS unit of the one or more OBS units. The third OBS unit can move down the helix structure towards the opening responsive to the conveyor receiving the first OBS unit and the second OBS unit.

The method can include inserting, by a second conveyor, the first OBS unit into the case via a second opening of the case. A helix structure in the can receive the first OBS unit via the second opening. The first OBS unit can move towards the opening via the helix structure. The helix structure can include an unpowered gravity conveyor. The method can include placing the case on a base configured to support the case.

The method can include providing one or more OBS units for reception by one or more helix structures in the case via one or more openings of the case. For example, a single opening can be used to provide OBS units to multiple helix structures within the case. In another example, a first opening in the case can be used to provide OBS units to a first helix structure in the case, and a second opening in the case can be used to provide OBS units to a second helix structure in the case. The first and second openings can be located above one another, adjacent one another, near one another, in a horizontal plane, vertical plane or diagonal plane.

The method can include inserting the first OBS unit into the case placed on the receptacle. In some embodiments, the method can include inserting, by the second conveyor, a second OBS unit of the one or more OBS units into the case via a third opening of the case. A second helix structure in the case can receive the second OBS unit via the third opening. The second OBS unit can move, via the second helix structure, towards a fourth opening of the case below the second opening.

The method can include placing the case on a receptacle configured to support the case. The receptacle can be in contact with the seabed. The conveyor of the underwater vehicle can receive the first OBS unit from the case on the receptacle.

At least one aspect is directed to a system to acquire seismic data from a seabed. The system includes an underwater vehicle having a sensor. The sensor can be used to identify a case. The case can have a hydrodynamic shape and store one or more OBS units. The underwater vehicle can have an arm and an actuator to position the arm in an open state above a cap of the case, or close the arm. The underwater vehicle can be configured to move the arm to a bottom portion of the case opposite the cap. The underwater vehicle can move the arm such that an opening of the case is aligned with the conveyor of the underwater vehicle. The conveyor can be configured to receive, via the opening of the case, a first OBS unit of the one or more OBS units. The conveyor can move the first OBS unit to the seabed to acquire seismic data from the seabed.

The case can include a first portion that is hydrodynamic and a second portion configured to produce drag to dampen rotation of the case through an aqueous medium. The case can include a helix structure to store the one or more OBS units and convey the one or more OBS units from a second opening of the case to the opening of the case. A first distance between the opening and the cap can be less than a second distance between the second opening and the cap. The case can include a plurality of helix structures to store the one or more OBS units. The underwater vehicle can include at least one of a remotely operated vehicle or an autonomously operated vehicle.

In some embodiments, the case can be a solid, continuously closed case. In some embodiments, the case can include perforations, holes, a mesh, a skeleton type structure, or a lattice structure configured to contain OBS units.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims. The drawings are not intended to be drawn to scale. Like reference numbers and designations in the various drawings indicate like elements. For purposes of clarity, not every component may be labeled in every drawing. In the drawings:

FIG. 7 illustrates a system to transfer units to or from a seabed in accordance with an embodiment.

FIG. 8B illustrates a skid system to acquire seismic data from a seabed in accordance with an embodiment.

DETAILED DESCRIPTION

Following below are more detailed descriptions of various concepts related to, and implementations of, methods, apparatuses, and systems of determining or estimating the depth of one or more receivers such as seismic data acquisition units associated with a seismic survey, as well as determining or estimating water column transit velocity of an acoustic or other signal that propagates to or from a seismic source through a water column. The various concepts introduced above and discussed in greater detail below may be implemented in any of numerous ways.

Systems, methods, and apparatus of the present disclosure generally relate to acquiring seismic data from or via a seabed. The system can use a torpedo shaped transfer system or transfer device to transfer or transport OBS units from a location above the surface of water to a location below the surface of water at a seabed. The torpedo shaped transfer system can also be used to retrieve OBS units from the seabed or a location below the surface of water, back to a location above the surface of water, such as onto a vessel. The torpedo shaped transfer system or device can include a cylindrical case with a spiral structure, helix structure, spiral slide, or coil provided within the case. The case can include one or more fins or protrusions configured to produce or exert a force (e.g., drag) that can stabilize rotation of the case (e.g., within 10 degrees of rotation). In some embodiments, the case may be a hydrodynamic shape configured to produce the drag to stabilize rotation without using fins. A height of the cylindrical case can be greater than a diameter of the cylinder. The helix structure can provide an unpowered, gravity conveyor that allows OBS units to slide from a top portion of the helix structure to a bottom portion of the helix structure to facilitate loading and unloading the transfer device.

Figure 1:
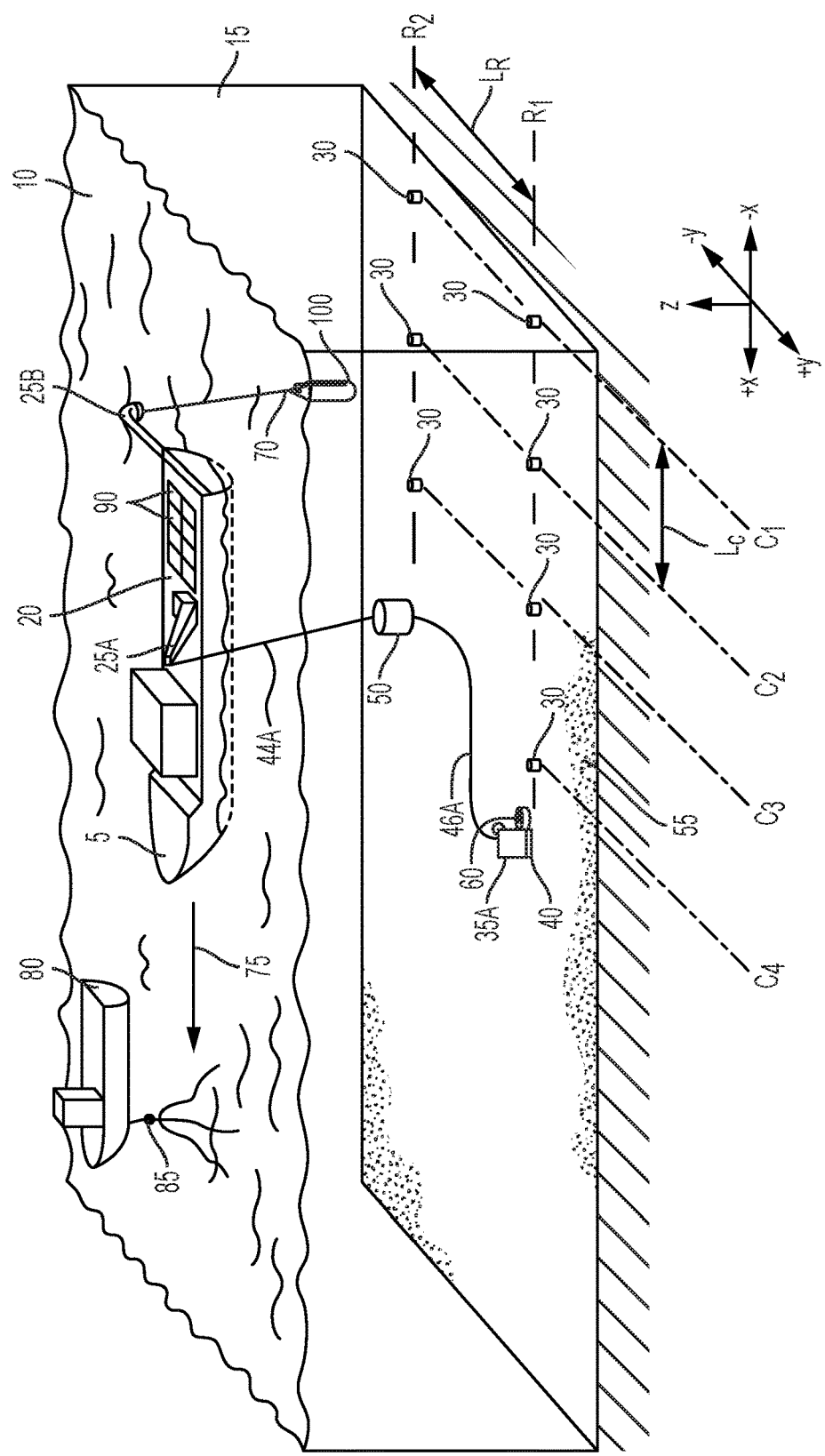
FIG. 1 is an isometric schematic view of an embodiment of a seismic operation in deep water.

Referring now to FIG. 1, an isometric schematic view of an embodiment of a seismic operation in deep water facilitated by a first marine vessel 5 is shown. The data processing system can obtain the seismic data via the seismic operation. While this figure illustrates a deep water seismic operation, the systems and methods described herein can use seismic data obtained via streamer data, land-based seismic operations. In this example, the first vessel 5 is positioned on a surface 10 of a water column 15 and includes a deck 20 which supports operational equipment. At least a portion of the deck 20 includes space for a plurality of sensor device racks 90 where seismic sensor devices (or seismic data acquisition units or nodes) are stored. The sensor device racks 90 may also include data retrieval devices or sensor recharging devices.

The deck 20 also includes one or more cranes 25A, 25B attached thereto to facilitate transfer of at least a portion of the operational equipment, such as an autonomous underwater vehicle (AUV), autonomously operated vehicle (AOV), an ROV or seismic sensor devices, from the deck 20 to the water column 15. For example, a crane 25A coupled to the deck 20 is configured to lower and raise an ROV 35A, which transfers and positions one or more sensor devices 30 (e.g., OBS units) on a seabed 55. The ROV 35A can be coupled to the first vessel 5 by a tether 46A and an umbilical cable 44A that provides power, communications, and control to the ROV 35A. A tether management system (TMS) 50A is also coupled between the umbilical cable 44A and the tether 46A. Generally, the TMS 50A may be utilized as an intermediary, subsurface platform from which to operate the ROV 35A. For most ROV 35A operations at or near the seabed 55, the TMS 50A can be positioned approximately 50 feet above seabed 55 and can pay out tether 46A as needed for ROV 35A to move freely above seabed 55 in order to position and transfer seismic sensor devices 30 thereon. The seabed 55 can include or refer to a continental shelf.

A crane 25B may be coupled (e.g., via a latch, anchor, nuts and bolts, screw, suction cup, magnet, or other fastener.) to a stern of the first vessel 5, or other locations on the first vessel 5. Each of the cranes 25A, 25B may be any lifting device or launch and recovery system (LARS) adapted to operate in a marine environment. The crane 25B may be coupled to a seismic sensor transfer device 100 by a cable 70. The transfer device 100 may be a drone, a skid structure, a basket, or any device capable of housing one or more sensor devices 30 therein. The transfer device 100 may be a structure configured as a magazine adapted to house and transport one or more sensor devices 30. The transfer device 100 may be configured as a sensor device storage rack for transfer of sensor devices 30 from the first vessel 5 to the ROV 35A, and from the ROV 35A to the first vessel 5. The transfer device 100 may include an on-board power supply, a motor or gearbox, or a propulsion system. In some embodiments, the transfer device 100 may not include any integral power devices or not require any external or internal power source. In some embodiments, the cable 70 may provide power or control to the transfer device 100. In some embodiments, the transfer device 100 can operate without external power or control. In some embodiments, the cable 70 may include an umbilical, a tether, a cord, a wire, a rope, and the like, that is configured to support, tow, position, power or control the transfer device 100.

The ROV 35A can include a seismic sensor device storage compartment 40 that is configured to store one or more seismic sensor devices 30 therein for a deployment or retrieval operation. The storage compartment 40 may include a magazine, a rack, or a container configured to store the seismic sensor devices. The storage compartment 40 may also include a conveyor, such as a movable platform having the seismic sensor devices thereon, such as a carousel or linear platform configured to support and move the seismic sensor devices 30 therein. In one embodiment, the seismic sensor devices 30 may be deployed on the seabed 55 and retrieved therefrom by operation of the movable platform. The ROV 35A may be positioned at a predetermined location above or on the seabed 55 and seismic sensor devices 30 are rolled, conveyed, or otherwise moved out of the storage compartment 40 at the predetermined location. In some embodiments, the seismic sensor devices 30 may be deployed and retrieved from the storage compartment 40 by a robotic device 60, such as a robotic arm, an end effector or a manipulator, disposed on the ROV 35A.

The seismic sensor device 30 may be referred to as seismic data acquisition unit 30 or node 30. The seismic data acquisition unit 30 can record seismic data. The seismic data acquisition unit 30 may include one or more of at least one geophone, at least one power source (e.g., a battery, external solar panel), at least one clock, at least one tilt meter, at least one environmental sensor, at least one seismic data recorder, at least global positioning system sensor, at least one wireless or wired transmitter, at least one wireless or wired receiver, at least one wireless or wired transceiver, or at least one processor. The seismic sensor device 30 may be a self-contained unit such that all electronic connections are within the unit. During recording, the seismic sensor device 30 may operate in a self-contained manner such that the node does not require external communication or control. The seismic sensor device 30 may include several geophones configured to detect acoustic waves that are reflected by subsurface lithological formation or hydrocarbon deposits. The seismic sensor device 30 may further include one or more geophones that are configured to vibrate the seismic sensor device 30 or a portion of the seismic sensor device 30 in order to detect a degree of coupling between a surface of the seismic sensor device 30 and a ground surface. One or more component of the seismic sensor device 30 may attach to a gimbaled platform having multiple degrees of freedom. For example, the clock may be attached to the gimbaled platform to minimize the effects of gravity on the clock.

For example, in a deployment operation, a first plurality of seismic sensor devices, comprising one or more sensor devices 30, may be loaded into the storage compartment 40 while on the first vessel 5 in a pre-loading operation. The ROV 35A, having the storage compartment coupled thereto, is then lowered to a subsurface position in the water column 15. The ROV 35A utilizes commands from personnel on the first vessel 5 to operate along a course to transfer the first plurality of seismic sensor devices 30 from the storage compartment 40 and deploy the individual sensor devices 30 at selected locations on the seabed 55 or ground surface 55 or sea floor 55 or earth surface 55 in a land based deployment. Once the storage compartment 40 is depleted of the first plurality of seismic sensor devices 30, the transfer device 100 (or transfer system 100, 200 or 400) can be used to ferry a second plurality of seismic sensor devices 30 as a payload from first vessel 5 to the ROV 35A.

The transfer system 100 may be preloaded with a second plurality of seismic sensor devices 30 while on or adjacent the first vessel 5. When a suitable number of seismic sensor devices 30 are loaded onto the transfer device 100, the transfer device 100 may be lowered by crane 25B to a selected depth in the water column 15. The ROV 35A and transfer device 100 are mated at a subsurface location to allow transfer of the second plurality of seismic sensor devices 30 from the transfer device 100 to the storage compartment 40. When the transfer device 100 and ROV 35A are mated, the second plurality of seismic sensor devices 30 contained in the transfer device 100 are transferred to the storage compartment 40 of the ROV 35A. Once the storage compartment 40 is reloaded, the ROV 35A and transfer device 100 are detached or unmated and seismic sensor device placement by ROV 35A may resume. In one embodiment, reloading of the storage compartment 40 is provided while the first vessel 5 is in motion. If the transfer device 100 is empty after transfer of the second plurality of seismic sensor devices 30, the transfer device 100 may be raised by the crane 25B to the vessel 5 where a reloading operation replenishes the transfer device 100 with a third plurality of seismic sensor devices 30. The transfer device 100 may then be lowered to a selected depth when the storage compartment 40 needs to be reloaded. This process may repeat as needed until a desired number of seismic sensor devices 30 have been deployed.

Using the transfer device 100 to reload the ROV 35A at a subsurface location reduces the time required to place the seismic sensor devices 30 on the seabed 55, or "planting" time, as the ROV 35A is not raised and lowered to the surface 10 for seismic sensor device reloading. Further, mechanical stresses placed on equipment utilized to lift and lower the ROV 35A are minimized as the ROV 35A may be operated below the surface 10 for longer periods. The reduced lifting and lowering of the ROV 35A may be particularly advantageous in foul weather or rough sea conditions. Thus, the lifetime of equipment may be enhanced as the ROV 35A and related equipment are not raised above surface 10, which may cause the ROV 35A and related equipment to be damaged, or pose a risk of injury to the vessel personnel.

Likewise, in a retrieval operation, the ROV 35A can utilize commands from personnel on the first vessel 5 to retrieve each seismic sensor device 30 that was previously placed on seabed 55. The retrieved seismic sensor devices 30 are placed into the storage compartment 40 of the ROV 35A. In some embodiments, the ROV 35A may be sequentially positioned adjacent each seismic sensor device 30 on the seabed 55 and the seismic sensor devices 30 are rolled, conveyed, or otherwise moved from the seabed 55 to the storage compartment 40. In some embodiments, the seismic sensor devices 30 may be retrieved from the seabed 55 by a robotic device 60 disposed on the ROV 35A.

Once the storage compartment 40 is full or contains a pre-determined number of seismic sensor devices 30, the transfer device 100 can be lowered to a position below the surface 10 and mated with the ROV 35A. The transfer device 100 may be lowered by crane 25B to a selected depth in the water column 15, and the ROV 35A and transfer device 100 are mated at a subsurface location. Once mated, the retrieved seismic sensor devices 30 contained in the storage compartment 40 are transferred to the transfer device 100. Once the storage compartment 40 is depleted of retrieved sensor devices, the ROV 35A and transfer device 100 are detached and sensor device retrieval by ROV 35A may resume. Thus, the transfer device 100 can ferry the retrieved seismic sensor devices 30 as a payload to the first vessel 5, allowing the ROV 35A to continue collection of the seismic sensor devices 30 from the seabed 55. In this manner, sensor device retrieval time is significantly reduced as the ROV 35A is not raised and lowered for sensor device unloading. Further, mechanical stresses placed on equipment related to the ROV 35A are minimized as the ROV 35A may be subsurface for longer periods.

In this embodiment, the first vessel 5 may travel in a first direction 75, such as in the +X direction, which may be a compass heading or other linear or predetermined direction. The first direction 75 may also account for or include drift caused by wave action, current(s) or wind speed and direction. In one embodiment, the plurality of seismic sensor devices 30 are placed on the seabed 55 in selected locations, such as a plurality of rows $R_n$ in the X direction ($R_1$ and $R_2$ are shown) or columns $C_n$ in the Y direction ($C_1$, $C_2$, $C_3$, and $C_4$ are shown), wherein n equals an integer. In one embodiment, the rows $R_n$ and columns $C_n$ define a grid or array, wherein each row $R_n$ comprises a receiver line in the width of a sensor array (X direction) or each column $C_n$ comprises a receiver line in a length of the sensor array (Y direction). The distance between adjacent sensor devices 30 in the rows is shown as distance $L_R$ and the distance between adjacent sensor devices 30 in the columns is shown as distance $L_C$. While a substantially square pattern is shown, other patterns may be formed on the seabed 55. Other patterns include non-linear receiver lines or non-square patterns. The pattern(s) may be pre-determined or result from other factors, such as topography of the seabed 55. In some embodiments, the distances $L_R$ and $L_C$ may be substantially equal (e.g., plus or minus 10% of each other) and may include dimensions between about 60 meters to about 400 meters. In some embodiments, the distances $L_R$ and $L_C$ may be different. In some embodiments, the distances $L_R$ or $L_C$ may include dimensions between about 400 meters to about 1100 meters. The distance between adjacent seismic sensor devices 30 may be predetermined or result from topography of the seabed 55 as described above.

The first vessel 5 is operated at a speed, such as an allowable or safe speed for operation of the first vessel 5 and any equipment being towed by the first vessel 5. The speed may take into account any weather conditions, such as wind speed and wave action, as well as currents in the water column 15. The speed of the vessel may also be determined by any operations equipment that is suspended by, attached to, or otherwise being towed by the first vessel 5. For example, the speed is typically limited by the drag coefficients of components of the ROV 35A, such as the TMS 50A and umbilical cable 44A, as well as any weather conditions or currents in the water column 15. As the components of the ROV 35A are subject to drag that is dependent on the depth of the components in the water column 15, the first vessel speed may operate in a range of less than about 1 knot. For example, when two receiver lines (rows $R_1$ and $R_2$) are being laid, the first vessel includes a first speed of between about 0.2 knots and about 0.6 knots. In some embodiments, the first speed includes an average speed of between about 0.25 knots, which includes intermittent speeds of less than 0.25 knots and speeds greater than about 1 knot, depending on weather conditions, such as wave action, wind speeds, or currents in the water column 15.

During a seismic survey, one receiver line, such as row $R_1$ may be deployed. When the single receiver line is completed a second vessel 80 is used to provide a source signal. The second vessel 80 is provided with a source device 85, which may be a device capable of producing acoustical signals or vibrational signals suitable for obtaining the survey data. The source signal propagates to the seabed 55 and a portion of the signal is reflected back to the seismic sensor devices 30. The second vessel 80 may be required to make multiple passes, for example at least four passes, per a single receiver line (row $R_1$ in this example). During the time the second vessel 80 is making the passes, the first vessel 5 continues deployment of a second receiver line. However, the time involved in making the passes by the second vessel 80 can be shorter than the deployment time of the second receiver line. This causes a lag time in the seismic survey as the second vessel 80 sits idle while the first vessel 5 is completing the second receiver line.

In some embodiments, the first vessel 5 can utilize an ROV 35A to lay sensor devices to form a first set of two receiver lines (rows $R_1$ and $R_2$) in any number of columns, which may produce a length of each receiver line of up to and including several miles. The two receiver lines (rows $R_1$ and $R_2$) can be substantially parallel, e.g. within +/−20 degrees of parallel. When a single directional pass of the first vessel 5 is completed and the first set (rows $R_1$, $R_2$) of seismic sensor devices 30 are laid to a predetermined length, the second vessel 80, provided with the source device 85, is utilized to provide the source signal. The second vessel 80 may make eight or more passes along the two receiver lines to complete the seismic survey of the two rows $R_1$ and $R_2$.

While the second vessel 80 is shooting along the two rows $R_1$ and $R_2$, the first vessel 5 may turn 180 degrees and travel in the −X direction in order to lay seismic sensor devices 30 in another two rows adjacent the rows $R_1$ and $R_2$, thereby forming a second set of two receiver lines. The second vessel 80 may then make another series of passes along the second set of receiver lines while the first vessel 5 turns 180 degrees to travel in the +X direction to lay another set of receiver lines. The process may repeat until a specified area of the seabed 55 has been surveyed. Thus, the idle time of the second vessel 80 is minimized as the deployment time for laying receiver lines is cut approximately in half by deploying two rows in one pass of the vessel 5.

Although only two rows $R_1$ and $R_2$ are shown, the sensor device 30 layout is not limited to this configuration as the ROV 35A may be adapted to layout more than two rows of sensor devices in a single directional tow. For example, the ROV 35A may be controlled to lay out between three and six rows of sensor devices 30, or an even greater number of rows in a single directional tow. The width of a "one pass" run of the first vessel 5 to layout the width of the sensor array is typically limited by the length of the tether 46A or the spacing (distance $L_R$) between sensor devices 30.

Figure 2A:
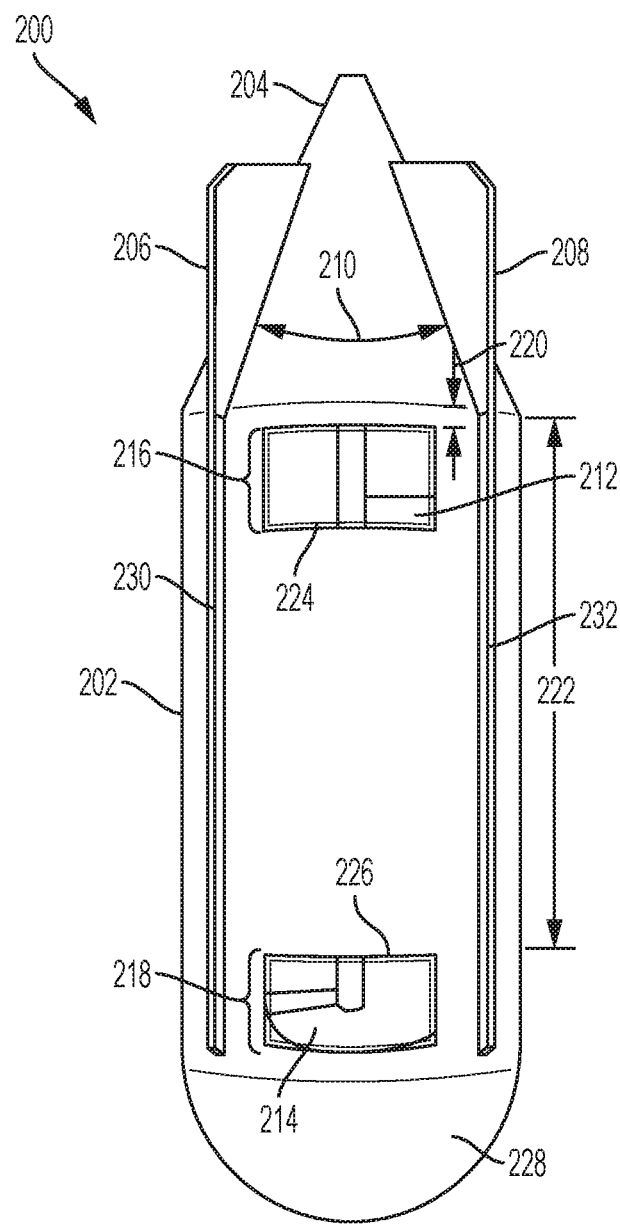
FIG. 2A is a system for acquiring seismic data, in accordance with an embodiment.

FIG. 2A is a system for acquiring seismic data in accordance with an embodiment. The system 200 includes a case 202. The system 200 includes a cap 204 positioned adjacent to a first end of the case 200. The system 200 can include a conveyor 302 (shown in FIG. 3). The conveyor 302 can have a helical shape.

The system 200 can include a portion to produce drag as the case 202 moves through an aqueous medium. For example, the system 200 (e.g., a marine seismic OBS storage case) can include an element to control rotation, such as a steering element, stabilization member, a fin, extrusion, or protrusion. The system 200 can include a first fin 206 extending from at least one of the cap 204 or the case 202. The system 200 can include a second fin 208 extending from at least one of the cap 204 or the case 202. The first fin 206 can be separated from the second fin 208 by a predetermined angle 210 to control rotation, control motion, or create a force to be exerted on the case 202 to control a dynamic or motion of the case 202 as it moves through an aqueous medium. Thus, the system 200 can be constructed and configured without any fins, with a single fin, or with a plurality of fins.

In further detail, the system 200 includes a case 202. The case 202 can be made from or composed of one or more materials that are suitable for use in an aqueous environment. For example, the case can include one or more of plastics, metals, fiberglass, PolyVinyl Chloride, steel, iron, composite materials, steel-reinforced cement, or aluminum. The material used to make the case can be selected based on a coefficient of friction of the material. For example, the material can be selected in order to reduce the friction or drag force caused by the case 202 as the case 202 moves through the aqueous medium. The case can be polished or smoothed to reduce drag.

In some embodiments, the case 202 can be formed as a continuous, solid structure. The case 202 can be an open-ended case at one or both ends, or a closed-ended case at one or both ends. The case 202 can include an exterior surface that is a continuous sheet of material, closed or non-porous. In some embodiments, the surface of the case 202 can include a porous structure. For example, the case 202 can include perforations, holes, a mesh, a skeleton type structure, or a lattice structure. The case 202 can be constructed to hold or contain one or more OBS units within the case such that the OBS units do not fall out of the case while the case is transported or moved from one position to another.

The case 202 can be constructed to be hydrodynamic in order to travel through an aqueous medium, such as an ocean, sea, lake, river, shore, intertidal zones, or other body of water. Hydrodynamic can refer to a shape that facilitates the case moving through the aqueous medium by reducing drag. Drag or drag force can include one or more of hydrodynamic drag, pressure drag, form drag, profile drag, or aerodynamic drag. Drag can refer to the force on an object that resists the motion of the object through a fluid, such as water. For example, drag can refer to the portion of the drag force that is due to inertia of the fluid, such as the resistance of the fluid to being pushed aside as the case 202 is moved through the aqueous medium.

The drag force can be determined using the following equation: $R=\frac{1}{2}\rho CAv2$, where R refers to drag force; $\rho$ refers to the density of the fluid or aqueous medium (e.g., ocean water can have a density of 1027 kHz/m3 due to the salt in the ocean); C refers to a coefficient of drag that takes into account factors such as shape, texture, viscosity, compressibility, lift, or boundary layer separation; A refers to the cross sectional area projected in the direction of motion; v refers to the speed of the case 202 as it moves through the aqueous medium (e.g., the speed can be the magnitude of the velocity of the case relative to the aqueous medium).

The system 200 can include one or more caps 204 positioned adjacent to a first end of the case 200. In some embodiments, the case 202 and cap 204 can be a single component. In some embodiments, the case 202 and cap 204 can be separate components that are assembled together, connected, coupled, joined or otherwise affixed adjacent to one another. The cap 204 can be connected, coupled, joined or otherwise affixed to the case 202 in an irremovable manner or a removable manner. For example, the cap 204 can be fixed to the case 202 using one or more screws, bolts, nuts, latches, magnets, adhesives, solder, pins, clips, a tongue and groove joint, or a mechanical splice. In some embodiments, the cap 204 can be screwed onto the case 202. For example, one of the case 202 or the cap 204 can include a raised helical thread, while the other of the case 202 or the cap 204 can include a helical groove to receive the raised helical thread. The cap 204 can be fastened to the case 202.

The cap 204 can be formed of the same or different material as the case 202. The cap 204 can be designed and constructed to generate more or less drag than the case 202. In some embodiments, the cap 204 can be designed and constructed to generate greater drag force than the case 202. In some embodiments, the cap 204 can have a shape, such as a cone, dome, hemisphere, flat, prism, pyramid, triangular pyramid, or square pyramid. The base of the cap 204 or footprint of the cap 204 can match or substantially match (e.g., within plus or minus 20%) a footprint of an end of the case 202 such that the base can be connected or coupled to the end of the case 202. The cap can be filed with a material, such as foam or syntactic foam. Syntactic foams can include composite materials synthesized by filling a metal, polymer, or ceramic matrix with hollow particles such as microballoons.

The system 200 can include a second cap 228 positioned adjacent to a second end of the case 202. For example, the second cap 228 can be at a bottom end of the case 202 when the case is oriented in an upright manner. The second cap 228 can include, e.g., a weighted cap such as a ballast. The second cap 228 can be weighted using a material (e.g., a heavy material with a density greater than water, such as greater than 1000 kg/m$^3$, 1500 kg/m$^3$, 2000 kg/m$^3$, 3000 kg/m$^3$, or 4000 kg/m$^3$) with a predetermined density in order to facilitate balancing the case in an upright manner, adjust buoyancy, drag, or other dynamic or static parameters of the case 202. For example, the second cap 228 can include a weight to provide negative buoyancy for the system 200 (e.g., including the cap 204, case 202, and second cap 228). The materials can include, e.g., gravel, sand, iron, lead, or stone. The second cap 228 can be formed of one or more materials similar to that of cap 204. The second cap 228 can be connected to the case 204 using one or more techniques used to connect cap 204 to the case 202. The second cap 228 can have a same or different shape than cap 202. For example, cap 204 can be conical shaped, and cap 228 can be hemispherical or dome shaped. In another example, both cap 204 and cap 228 can be dome shaped, or both cap 204 and cap 228 can be conical.

The system 200 can include a portion configured to control rotation of the case as the case moves through an aqueous medium. For example, a portion of the case can be configured or shaped in such a manner as to produce or exert force, such as drag, as the case moves through water. This force can facilitate stabilizing the case or limiting rotation of the case as the case moves through the water. The system 200 can include one or more fins that can be configured to control rotation of the case through an aqueous medium, dampen rotation, or otherwise exert force or create force to manipulate the dynamics of the case 202. Dampening rotation can include or refer to reducing rotational force or rotation by 5%, 10%, 20%, 25%, 30% or more. Dampening rotation can refer to or include reducing the rate of rotation, or preventing a full rotation. In some embodiments, the system 200 can include a first fin 206 extending from at least one of the cap 204 or the case 202. The system 200 can include a second fin 208 extending from at least one of the cap 204 or the case 202. The first fin 206 can be separated from the second fin 208 by a predetermined angle 210 to control rotation, control motion, or create a force (e.g., drag) to be exerted on the case 202 to control a dynamic or motion of the case 202 as it moves through an aqueous medium. The predetermined angle 210 can be determined based on an amount of drag to generate. The case 202 can be referred to as being phase-locked due to the drag force exerted by the fins canceling out a rotational force to thereby stabilize or dampen the rotation of the case.

The predetermined angle 210 can be determined based one or more of $\rho$, C, A; or v. For example, increasing the predetermined angle may increase the A, the cross sectional area projected in the direction of motion, which may increase the drag force exerted by the case 202 (including the one or more fins). The predetermined angle can include an angle in the range between substantially 45 degrees to substantially 180 degrees (e.g., where substantially can refer to plus or minus 10 degrees), or between 70 degrees and 110 degrees. The predetermined angle can be 70 degrees, 80 degrees, 90 degrees, 100 degrees or 110 degrees or within plus or minus 10 degrees of the predetermined angle.

The fins 206 or 208 can include a material that allows the fins 206 or 208 to exert force without breaking. For example, the fins 206 or 208 can be made from fiberglass, ceramic, metal, iron, plastics, rubber, alloys, polymers, stone, cement, or gravel. The fins 206 can be made via an extrusion process. The fins 206 or 208 can be made from the same material or different materials. The fins 206 or 208 can have a predetermined stiffness or flexibility. For example, the stiffness of the fins 206 and 208 can refer to the extent to which the fins resist deformation in response to an applied force. The more flexible an object is, the less stiff the object is. The stiffness can refer to a measure of the resistance offered by an elastic body to deformation. The fins can deform along one or more degrees of freedom. The fins 206 and 208 can be flexible or rigid. For example, the fins 206 and 208 can be flexible enough such that they do not break under or otherwise compromise structural integrity of the fin, case 202 or cap 204 when under force. The fins 206 can have a high stiffness (e.g., 58 N/mm to 500 N/mm) medium stiffness (e.g., 40 N/mm to 58 N/mm) or low stiffness or be flexible (e.g., less than 40 N/mm). The stiffness of the fin 206 or 208 can vary from one end of the fin to another end of the fin. For example, an end of the fin 206 closer to the cap 204 or case 202 can have a greater stiffness as compared to an end of the fin 206 further from the cap 204 or case 202. The stiffness of the fin from one end to the other end can be controlled based on types of material(s) used to make the fin, structural design of the fin, or tapering of the fin 206 or 208.

The fins 206 or 208 can include any shape configured to exert a force including, e.g., a triangular shape, a rectangular shape, trapezoidal, trapezium, polygon shaped, circular, elliptical, or prism shaped. The fins can be tapered such that the fin can reduce in thickness or width towards one or more ends. For example, a first end of the fin 206 (e.g., a top end of the fin or an end of the fin closer to the tip of the cap) can have a greater width than a second of the fin (e.g., a bottom end of the fin adjacent to the case 202). For example, the first end of the fin 206 can have a width of 1 inch, 2 inch, 4 inches, 5 inches, 6 inches, 10 inches, 15 inches or other dimension to facilitate stabilizing the case or facilitate alignment. The second end of the fin 206 can have a same width as the first end, be wider than the first end, or be narrower than the first end. For example, the second end of the fin 206 can be 1 inch, 2 inch, 4 inches, 5 inches, 6 inches, 10 inches, 15 inches or other dimension to facilitate stabilizing the case or facilitate alignment. In some embodiments, the fins can extend 3 or 4 inches from the cylindrical portion of the case 202 and form a straight edge over the conical portion 204. The straight edge can be used to form guidance, rotation control, or stabilization. The dimensions of the fins can be adjusted or modified based on dimensions of the case 202, cap 204, the speed at which the case 202 moves through water, weight of the case 202, weight of the case 202 when loaded with objects, depth of the case 202 in the water column, or a size of a notch on a capture appliance or alignment mechanism. For example, one or more portions of the fin 206 can extend from the cap 202 up to 1.5 times the radius of the case 202 or cap 204. In some embodiments, the width of the fin 206 can be mechanically adjusted (e.g., made narrower or wider). For example, the fin can be mechanically adjusted by folding or unfolding an extension portion, or sliding in or out an extension portion.

The one or more fins (e.g., 206 or 208) can be connected to the case 202 or cap 204. The case 202 or cap 204 and one or more fins can be separate components that are assembled together, connected, coupled, joined or otherwise affixed adjacent to one another. The one or more fins can be connected, coupled, joined or otherwise affixed to the case 202 or cap 204 in an irremovable manner or a removable manner. For example, the one or more fins can be fixed to the case 202 or cap 204 using one or more screws, bolts, nuts, latches, magnets, adhesives, solder, pins, clips, a tongue and groove joint, or a mechanical splice. In some embodiments, the one or more fins can be screwed onto the case 202 or cap 204. The one or more fins can be fastened to the case 202 or cap 204.

The system 200 can include one or more runners 230 and 232. The runner can protrude from, and extending along, a longitudinal axis of the cylindrical portion of the case 202. The cylindrical portion can refer to the portion of the case 202 between the cap 204 and the ballast 228. The runner 230 or 232 can extend along the entire case 202 or a portion of the case 202 (e.g., 20% of the case, 30%, 50%, 70%, or 90%). The runner 230 or 232 can exert force to control rotation, dampen rotation, or manipulate or control a dynamic of the case. The runner 230 or 232 can further be configured to facilitate aligning an opening of the case with an external component, such as a conveyor.

The runner 230 or 232 can include one or more material of the fin 206 and be connected or coupled to the case 202. The runner 230 can be formed as part of the case 202, or coupled using one or more coupling technique. The runner 230 or 232 can be configured to facilitate alignment of the case 202. The runner 230 and fin 206 can be coupled or connected to one another, be formed as a single component or structure, or be separate components.

Thus, in some embodiments, the system 200 may not include fins on the cap. The system 200 may not include a runner. The system 200 can include one of a fin or a runner. The system 200 can include both a fin and a runner. The system 200 can include one or more fins and one or more runners. In some embodiments, the system 200 may not control rotation of the case 202, or may control rotation of the case using other mechanical, powered, or unpowered techniques or in-water motion control mechanisms.

The case 202 can include one or more openings 216 and 218. The openings 216 and 218 can be configured to allow seismic data acquisition units, ocean bottom seismometers, geophones, nodes, devices or other matter to pass through the case 202. Devices can enter the case 202, be inserted, deposited, placed, or otherwise provided to an internal compartment of the case formed by the walls of the case 202 via the one or more openings. Devices can exit, leave, depart, eject, be retrieved, be received or otherwise provided external to the case via the one or more openings. In some embodiments, the case includes multiple openings 216 and 218. For example, a first opening 216 can be closer to the cap 204, as compared to the second opening 218. For example, a first distance between 220 the first opening 216 and the cap 204 can be less than a second distance 220 between the second opening 218 and the cap 204. The first distance 220 can be determined from a top of the first opening 216 and a bottom of the cap 204. The first distance 220 can be determined from a middle or bottom of the first opening 216 and a middle or top of the cap 204. The second distance 222 can be determined from a top of the second opening 218 and a bottom of the cap 204. The second distance 222 can be determined from a middle or bottom of the second opening 218 and a middle or top of the cap 204. Distances can be measured or determined using any units or measures of distance including, e.g., inches, feet, meters, centimeters, etc. The second opening 218 can be closer to the ballast 228 (e.g., second cap 228) as compared to the first opening 216. For example, a distance between the first opening 216 and the ballast 228 can be greater than a distance between the second opening 218 and the ballast 228. The first opening 216 can correspond to a top opening 216 when the case 202 is oriented in a substantially vertical manner (e.g., an angle between a vertical axis of the cylindrical case 202 and a horizontal plane is greater than 0 degrees and less than 180 degrees). The second opening 218 can correspond to a bottom opening 218 when the case 202 is oriented in the substantially vertical manner. In some embodiments, the opening 216 can correspond to the top opening 216 and the opening 218 can correspond to the bottom opening 218 regardless of the current physical orientation of the case 202.

The one or more openings 216 and 218 can have the same dimensions, substantially similar dimensions, or different dimensions. The dimensions can be determined based on the dimensions of objects that are to be inserted or removed from the case via the openings 216 and 218. For example, a case 202 configured to hold OBS units can be configured with openings that are based on the dimensions of the OBS units. The openings can be have a width or diameter of 4 to 50 inches, and height of 2 to 20 inches high. The shape of the openings 216 and 218 can include rectangular shaped, circular, elliptical, trapezoidal, rectangular with rounded corners, polygonal, or any other shape that facilitates allowing objects to pass through the case.

The openings 216 and 218 can be above one another such that a vertical or longitudinal axis passes through both openings 216 and 218. The openings 216 and 218 can be on a same side of the case 202 or on different sides or portions of the case 202. For example, opening 216 can be on a first side of case 202, and opening 218 can be on a second side of the case 202 different from the first side. The openings 216 and 218 can be diagonal from one another such that a vertical or horizontal axis that passes opening 216 does not pass through opening 218.

The system 200 can include one or more gates 224 or 226. The gates 224 or 226 can cover, block or otherwise obstruct an opening of the case (e.g., obstructing the opening such that a device, object, or OBS node cannot pass through the opening). For example, a first gate 224 can cover or block opening 216, and a second gate 226 can cover or block opening 218. The gate 224 or 226 can be formed of any material to facilitate blocking or covering the opening. In some embodiments, the gate 224 or 226 can be formed of one or more materials capable of blocking or preventing device in the case from leaving the case 202. For example, the gate 224 can be structurally strong enough to prevent an OBS unit from falling out of the case 202 while the case 202 is in motion, or prevent the OBS unit from sliding out from a conveyor within the case when the case 202 is stationary. The gate 224 or 226 can include a mesh gate, rope gate, metal gate, plastic gate, alloy gate, polymer-material based gate, wood gate, ceramic gate, fiberglass gate, or chain-link gate.

The gates 224 and 226 can be made of the same material or different materials. For example, gate 224 can be a weaker gate as compared to gate 226. Gate 224 can have less structural integrity as compared to gate 226. Gate 224 can be less stiff as compared to gate 226. This may be because gate 226 can be configured to prevent OBS units from falling out of the bottom opening 218. Thus, gate 226 can be strong enough to withstand the force exerted by several OBS units that are held in a gravity conveyor within the case 202. Gate 224 may be weaker than gate 226 because gate 224 may not have to be configured to withstand the force exerted by several OBS unit because the OBS units may not be pushing up against gate 224.

The gates 224 and 226 can open or close using one or more technique. The gates 224 or 226 can be a sliding gate (e.g., vertical, horizontal, diagonal or along another axis of the case 202 or cylindrical portion of the case 202), revolving gate, hinged gate, rotate gate, swing gate, sliding gate, barrier gate, or overhead gate. The system 200 can include one or more gate openers. The gate 224 can include a gate opener and the gate 226 can include a gate opener. The gate opener can include a mechanical device configured to open and close the gate, such as a hydraulic gate opener, electromechanical gate opener, or a gate opener that providers mechanical tension. For example, the gate can be under mechanical tension produced by a mechanical spring, coil, lever, compression spring, tension spring, flat spring, serpentine spring, cantilever spring, helical spring, leaf spring, or other elastic object that can store mechanical energy.

The gate 224 or 226 can include a locking mechanism, such as a latch, lever, pin, gravity latch, spring latch, turn latch, or slide bolts. For example, the locking mechanism can keep the gate in a closed position or closed state. The gate can be coupled to a spring that is stretched or under mechanical tension when the gate is closed. Releasing the locking mechanism can allow the spring to return to equilibrium from the tension or stretched state, thereby pulling open the gate. In some embodiments, the gate opener can powered and include a motor, rails, chains, and other devices to open and close the gate.

Figure 2B:
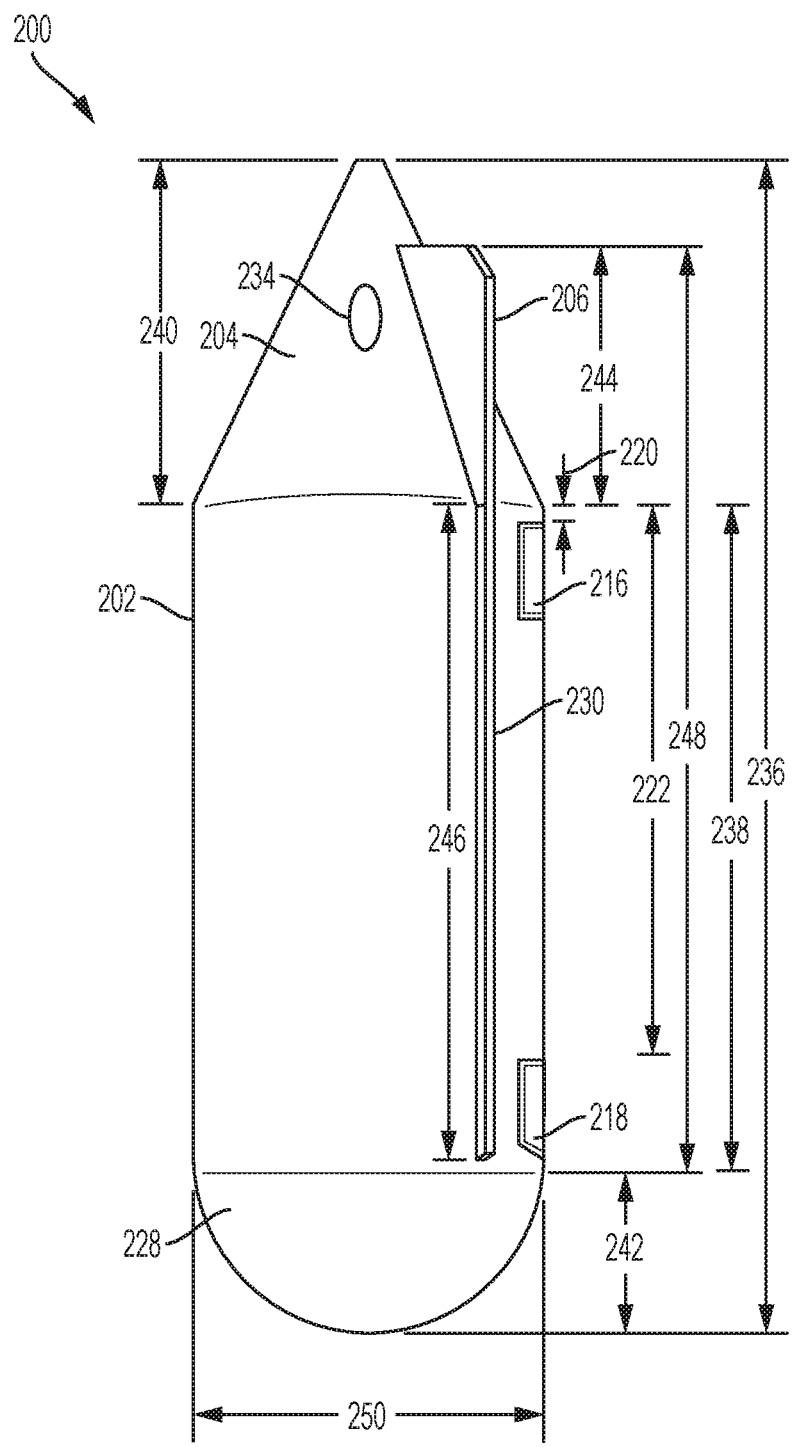
FIG. 2B is a side perspective view of a system for acquiring seismic data, in accordance with an embodiment.
Figure 2C:
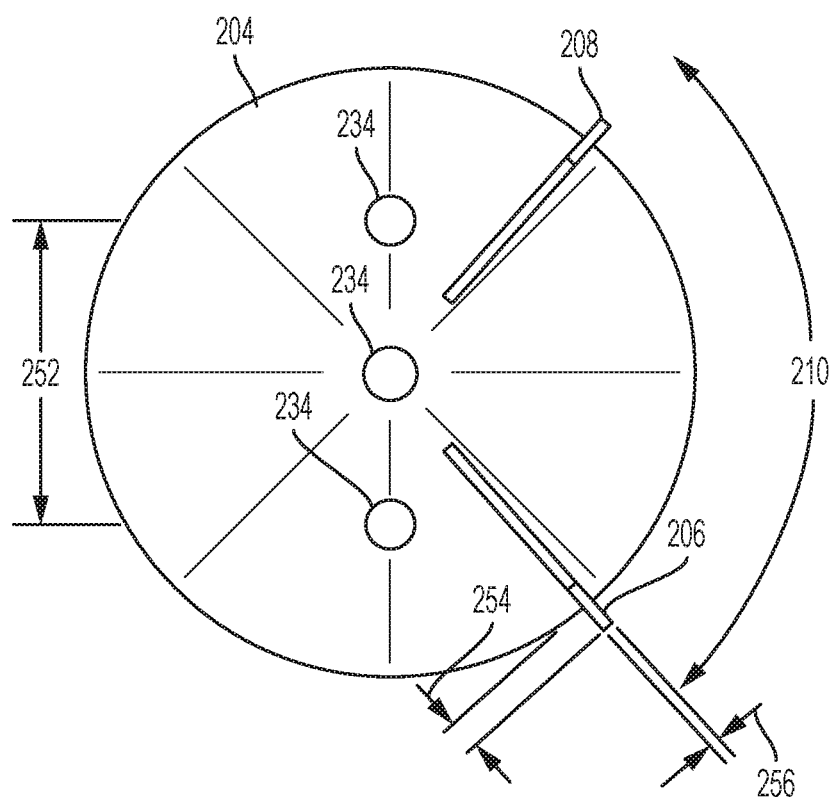
FIG. 2C is a top perspective view of a system for acquiring seismic data, in accordance with an embodiment.

FIG. 2B illustrates a side view of the system 200 for acquiring seismic data in accordance with an embodiment. FIG. 2B illustrates a perspective view of the case 200, cap 204, ballast 228, first fin 206, first runner 230, opening 216, and opening 218. The width or diameter of the case 204 or ballast 228 is 250. The diameter or width 250 can range, for example, from 3 feet to 8 feet. For example, the diameter can be 4 feet, 4.5 feet, 5 feet, 5.5 feet, or 6 feet. The ballast width can be the same or different from the width of the case 202 or the cap 204. For example, the ballast width can be greater than the width of the case, less than the width of the case, or substantially similar to the width of the case (e.g., plus or minus 10% difference). The cap 204 width can be greater than the width of the case, less than the width of the case, or substantially similar to the width of the case (e.g., plus or minus 10% difference).

The height 236 of the system 200 can refer to the height from an external end of the ballast 228 to the external tip of the cap 204 when the cap 204 and the ballast 228 are attached or adjacent to the case 202. The height 236 can range, for example, from 6 feet to 20 feet. For example, the height 236 can be 12 feet, 12.5 feet, 13 feet, 13.5 feet, 14 feet, 14.5 feet, or 15 feet.

The height 238 can correspond to the height of the case 202 without the cap 204 and the ballast 228. The height 238 can range, for example, from 4 feet to 15 feet. The height 240 can correspond to the height of the cap 204. The height 240 can range, for example, from 0.5 feet to 5 feet. The height 242 can correspond to the height of the ballast 224. The height 242 can range, for example, from 0.5 feet to 5 feet. The height 244 can correspond to the height of one or more fins 206 or 208. The fins can have the same height or be at different heights. The height 244 can range, for example, from 0.2 feet to 4 feet. The height 246 can correspond to the height of the one or more runners 230 and 232. The runners can have the same height or different heights. The height 246 can range, for example, from 0.2 feet to 15 feet. The height 246 of the runner 230 can be less than or equal to the height 238 of the case 202. The height 248 can correspond to the height from a bottom end of case 202 to the top of the fin 206. The height 248 can range, for example, from 7 feet to 15 feet. The height 248 can be 10.5 feet.

The distance or height 220 can refer to the distance between the top opening 216 and the cap 206. The distance or height H9 can refer to the distance between the bottom opening 218 and the cap 206. The distance 220 can be less than the distance H9.

The system 200 can include one or more beacons 234. The beacon 234 can include or refer to a transponder. The beacon 234 can be positioned anywhere on the case that facilitates transmitting or receiving data. The beacon 234 can include a wireless transponder, such as an acoustic transponder, optical transmitter, light source, optical detector, optical receiver, magnetic transponder, or motion detector. In some embodiments, the beacon 234 can be positioned on a portion of the cap 204. The beacon 234 can be positioned proximate to the first fin or the second fin. For example, the beacon 234 can be positioned adjacent to a fin 206 or fin 208 or within 1 foot of a portion of the fin 206 or fin 208. The beacon 234 can be positioned between two fins 206 and 208. The beacon 234 can be positioned above a fin 206 or 208 (e.g., on an end of the cap 204 that is further from the case 202). The beacon can be positioned below the fin 206 or 208 (e.g., on an end of the cap 204 that is closer to the case 202). The beacon 234 can be positioned on the case 202 or ballast 228. For example, the beacon 234 can be positioned adjacent to an opening 216 or 218 or adjacent to a runner 230 or 243.

FIG. 2B illustrates a top view of the system 200 for acquiring seismic data in accordance with an embodiment. The top view of the system 200 illustrates a top perspective view of the cap 204. The top perspective view illustrates the fin 206 and fin 208. The fin 206 or 208 can have a thickness 256. The thickness 256 can range, for example, from 0.5 inches to 4 inches. For example, the thickness can be 1 inch, 1.5 inches, or 2 inches. The thickness of a runner 230 or 232 can be the same thickness 256 or a different thickness. The runner 230 can be thicker than the fin, or thinner than the fin. At least a portion of the fins 206 or 208 can extend from the cap 204 by a length 254. The length 254 can range, for example, from 0.5 inches to 1 foot. For example, the length 254 can be 1 inch, 2 inches, or 5 inches. The length 254 can correspond to the portion of the fin 206 or 208 that protrudes furthest from the cap 202. The length 254 can correspond to the length a runner 230 or 232 protrudes from the case. The runner 230 or 232 can protrude more than a fin 206, or less than a fin 208. The angle 210 between the fins can range from 70 degrees to 180 degrees. The angle can be, for example, 85 degrees, 90 degrees, 95 degrees, 97 degrees, 100 degrees, 105 degrees or substantially one of these degrees (e.g., plus or minus 20 percent). The angle between the runners can be the same or substantially similar (e.g., plus or minus 20%) as the angle 210, or different from the angle 210 (e.g., greater than plus or minus 20%).

The system 200 can include multiple beacons 234 or multiple transponders 234. The beacons 234 (or transponders) can each be the same type of beacon, or different types of beacons. For example, a first beacon 234 can be an acoustic beacon, a second beacon 234 can include a light source, and a third beacon 234 can include a radio frequency transmitter. The distance between the beacons can correspond to 252, which can range, for example, from 1 foot to 3 feet. For example, the distance between two beacons can be 2 feet.

Figure 3:
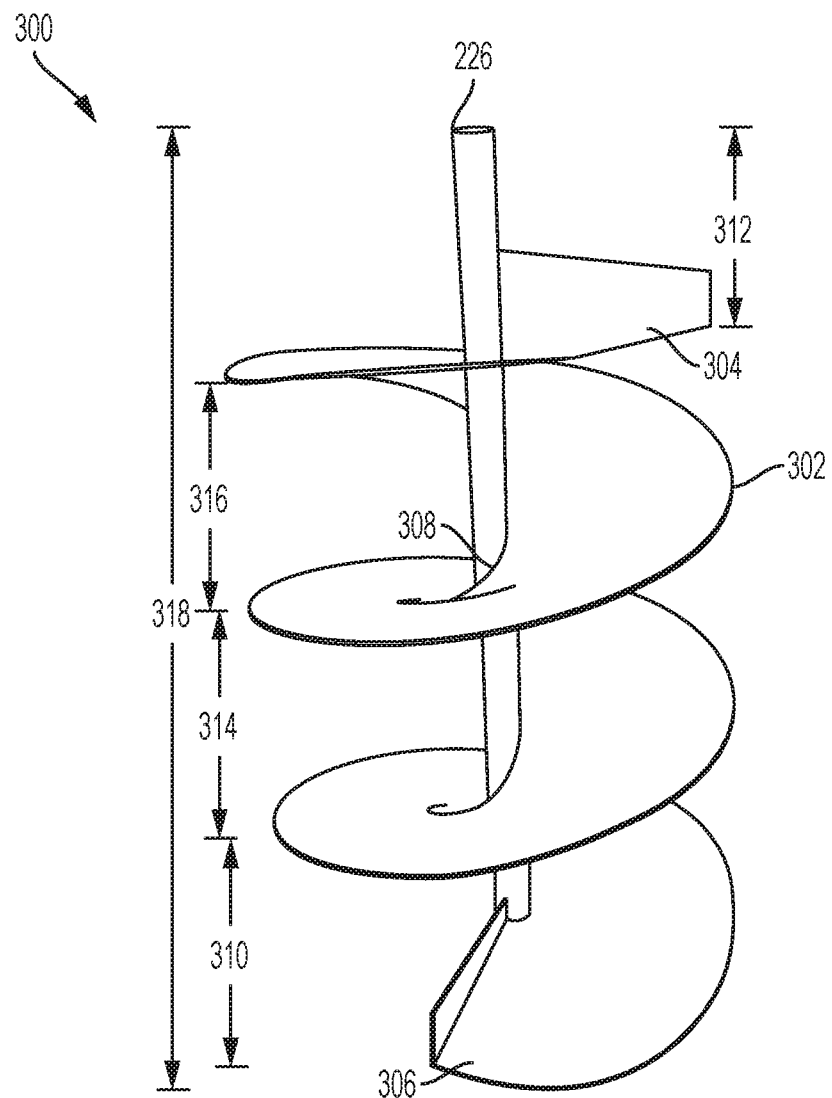
FIG. 3 illustrates a conveyor provided for the system for acquiring seismic data, in accordance with an embodiment.

FIG. 3 illustrates a conveyor provided for the system for acquiring seismic data, in accordance with an embodiment. The conveyor system 300 can include a conveyor 302 and support structure 226. The conveyor 302 can be provided within case 202 as part of system 200 depicted in FIG. 2A. For example, system 200 can include conveyor 302 and support structure 226. The conveyor 302 can have, include, or constructed as a helix structure. The conveyor 302 can be provided within the case 202 to receive objects or devices (e.g., OBS units) unit at a first end 304 of the conveyer and transport the OBS unit via the helix structure 302 to a second end 306 of the conveyor to provide the OBS unit on the seabed to acquire the seismic data. A first distance 312 between the first end 304 of the conveyor 302 and the cap 204 can be less than a second distance 318 between the second end 306 of the conveyor and the cap 204. The first end 306 of the conveyor can correspond to opening 216, and the second end 304 of the conveyor 302 can correspond to opening 218. For example, the opening 216 can be in alignment with the first end 306 of the conveyor such that when an object passes through the opening 216, the object can come into contact or be positioned on or near the first end 216 of the conveyor. The conveyor 302 can hold 5 to 20 OBS nodes 30 or more.

The conveyor 302 can have a helix structure. A helix structure can refer to a type of smooth space curve that has a property that a tangent line at any point makes a constant, including substantially constant (e.g., plus or minus 10 degrees) angle with a fixed line corresponding to an axis. The helix structure can facilitate load balancing nodes around a center or center column of the case 202. The helix structure can include a left-handed helix or a right-handed helix. The conveyor 302 can include helix structures such as coil springs, spiral slide, spiral ramps, or helicoid. The conveyor 302 can be a filled in helix or a helix coil. For example, the conveyor 302 can include one or more parallel rails forming a helix structure that guide OBS units from the first end to the second end. The conveyor 302 can include the helix structure with a center of the helix structure extending along an axis of the cylindrical portion of the case 202. The axis of the cylindrical portion of case 202 can refer to a central axis of the cylinder that travels longitudinally or vertically through the cylinder 202 at a center point of the cylinder.

The conveyor 302 can have or be constructed with a constant spiral pitch (e.g., substantially constant spiral pitch that varies less than plus or minus 20%). The spiral pitch of the helix can correspond to the width of one complete helix turn, measured parallel to the axis of the helix. The conveyor 302 can have a spiral pitch in the range of, for example, 1 foot to 3 feet. For example, the spiral pitch can be 24 inches, or correspond to the distance 314. In some embodiments, the distance 314, 316 and 310 can be the same or substantially similar (e.g., plus or minus 10%). In some embodiments, distance 314, 316 and 310 can differ (e.g., vary greater than 10%). In some embodiments, the spiral pitch may be greater at the top of the conveyor or at the first end 304 to facilitate moving OBS units from the first end 304 towards the second end 306; and the spiral pitch may be less towards the second end 306. In some embodiments, the spiral pitch may be greater at the second end 306 as compared to the first end 304 to facilitate removing OBS units from the second end 306.

The conveyor 302 can be made from or composed of one or more materials that are suitable for use in an aqueous environment. For example, the conveyor 302 can include one or more of plastics, metals, fiberglass, PolyVinyl Chloride, steel, iron, composite materials, steel-reinforced cement, or aluminum. The material used to make the conveyor 302 can be selected based on a coefficient of friction of the material. For example, the conveyor 302 can include an unpowered gravity conveyor, such as a slide. The coefficient of friction of the conveyor 302 can allow OBS units to slide down the conveyor from the first end 304 to the second 306 without the use of power.

The conveyor 302 can include or be formed or constructed from a single portion or multiple portions. For example, the conveyor 302 can be made from multiple portions such as ⅕ turn portions, ¼ turn portions, ⅓ turn portions, ½ turn portions or full turn portions. For example, the conveyor 302 can be formed of 8 quarter turn portions to create a two full turn conveyor 302. The multiple portions can be coupled, connected, affixed, or otherwise positioned adjacent to one another such at objects can pass from one portions to another portions. The multiple portions can be connected using adhesive, solder, molding, latches, screws, pins, tongue and groove joints, sockets or other coupling technique. The portions can be removable or irremovable coupled.

In some embodiments, the conveyor 302 can include rollers. The rollers can be mechanical rollers that are powered or unpowered. The rollers can facilitate moving, transporting or otherwise conveying OBS units or devices from the first end 304 towards the second end 306. In some embodiments, the conveyor 302 can include a belt, pneumatic conveyor, vibrating conveyor, flexible conveyor, lubricated conveyor, gravity skatewheel conveyor, wire mesh conveyor, plastic belt conveyor, chain conveyor, electric track vehicle conveyor, spiral conveyor, screw conveyor, or a drag conveyor. For example, the conveyor 302 can be lubricated with oil or another lubricant that can reduce friction and allow devices to travel from the first end 304 to the second end 306. In some embodiments, the conveyor 302 can include a belt that can be powered or driven to transport OBS units from the first end 304 to the second end 306. In some embodiments, the conveyor 302 can be powered to transport units from the second end 306 to the first end 304.

The system 200 can include a support structure 226. The support structure 226 can be configured or constructed to support the conveyor 302. In some embodiments, the support structure 226 includes a pole at a center of the helix structure. The pole 226 can be coupled, connected or otherwise attached to the conveyor 302 to support the conveyor at 308, for example. For example, the pole 226 can include grooves in which a portion of the conveyor 302 can be inserted to couple or connect the conveyor 302 to the pole 226. The pole 226 can be soldered to the conveyor 302, or attached to the conveyor using adhesives or magnetism. An end of the pole 226 can be coupled, attached, or otherwise adjacent to a bottom of the case 202, the ballast 228 or the cap 204.

In some embodiments, the case 202 can provide the support structure 226 for the conveyor 302. For example, an internal wall of the case 202 can include grooves in which a portion of the conveyor 302 can be inserted to provide support for the conveyor 302. In some embodiments, the conveyor 302 can support itself.

Figure 4A:
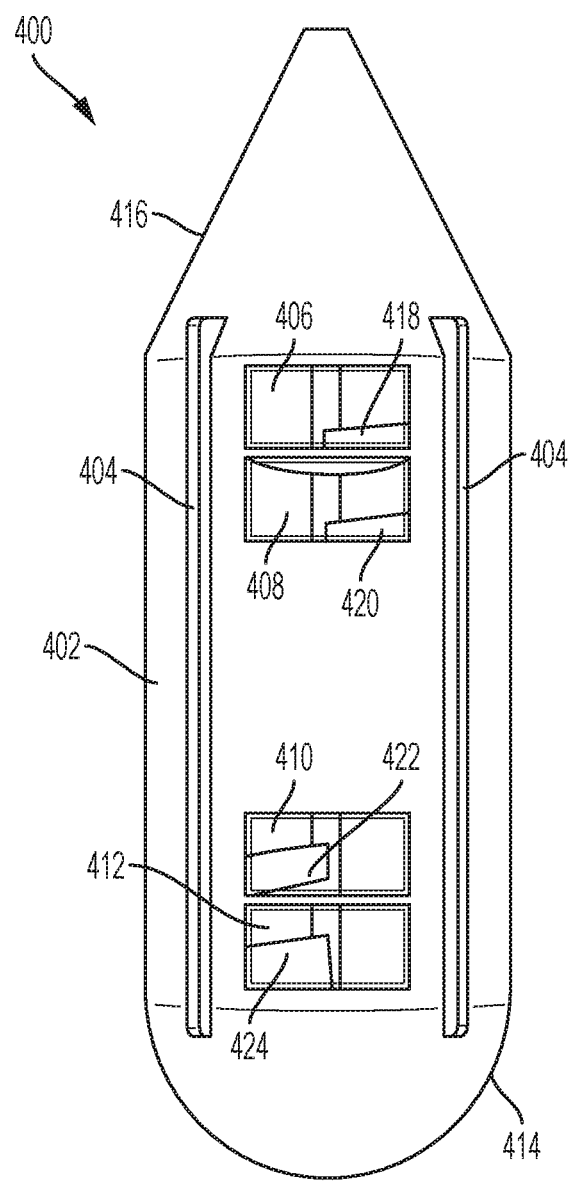
FIG. 4A is a system for acquiring seismic data, in accordance with an embodiment.

FIG. 4A is a system for acquiring seismic data in accordance with an embodiment. The system 400 can include one or more component, feature, material or function of system 200. For example, the system 400 can include multiple conveyors, more than two openings, or a larger case. The system 400 includes a case 402 that can be similar to case 302. The system 400 can include a cap 416 adjacent to an end of the case 402. The cap 416 can be similar to cap 204. The system 400 can include one or more runners 404 that can be similar to runner 230.

The system 400 can include one or more conveyors. The one or more conveyors can overlap, be staggered, be subsequent to one another, be adjacent to one another or otherwise be positioned or configured within case 402. For example, a first conveyor 502 and a second conveyor 504 can form a double helix structure. The conveyors 502 and 504 can be similar to, or include, or more component, feature, material or function as conveyor 302. The first conveyor 502 and the second conveyor 504 can both be right-handed helixes, left-handed helixes, or one can be a left-handed helix structure while the other is a right handed helix structure.

The system can include one or more openings 406, 408, 410 and 412. For example, a first opening 406 can correspond to a first end 418 of a first conveyor 502 provided within case 402; a second opening 410 can correspond to a second end 422 of the first conveyor 502 provided within the case 402; a third opening 408 can correspond to a first end 420 of a second conveyor 504 provided within the case 402; and a fourth opening 412 can correspond to a second end 424 of the second conveyor 504 provided within the case 402.

In some embodiments, the openings 406, 408, 410, and 412 can be vertically aligned. In some embodiments, the openings 406, 408, 410, and 412 may not be vertically aligned on the surface of the case 402. For example, the openings 406, 408, 410, and 412 can be on different sides of the case, overlap, or be staggered. In some embodiments, opening 406 and 408 can be a single opening, or opening 410 and opening 412 can be a single opening. The openings can be at different circumferential positions (such as 0 degrees and 180 degrees). The opening 406 can be above opening 408, or the opening 406 can be at the same level as opening 408. For example, a distance between a bottom portion of opening 408 and the cap can be equal to a distance between a bottom portion of opening 406 and the cap. The opening 410 can be above opening 412, or the opening 410 can be at the same level as opening 412. For example, a distance between a bottom portion of opening 410 and the cap can be equal to a distance between a bottom portion of opening 412 and the cap.

In some embodiments, the system 400 may not include fins on the cap 416. The system 400 may not include runner 404. The system 400 can include one of a fin or a runner. The system can include both a fin and a runner. The system 400 can include one or more fins and one or more runners.

Figure 4B:
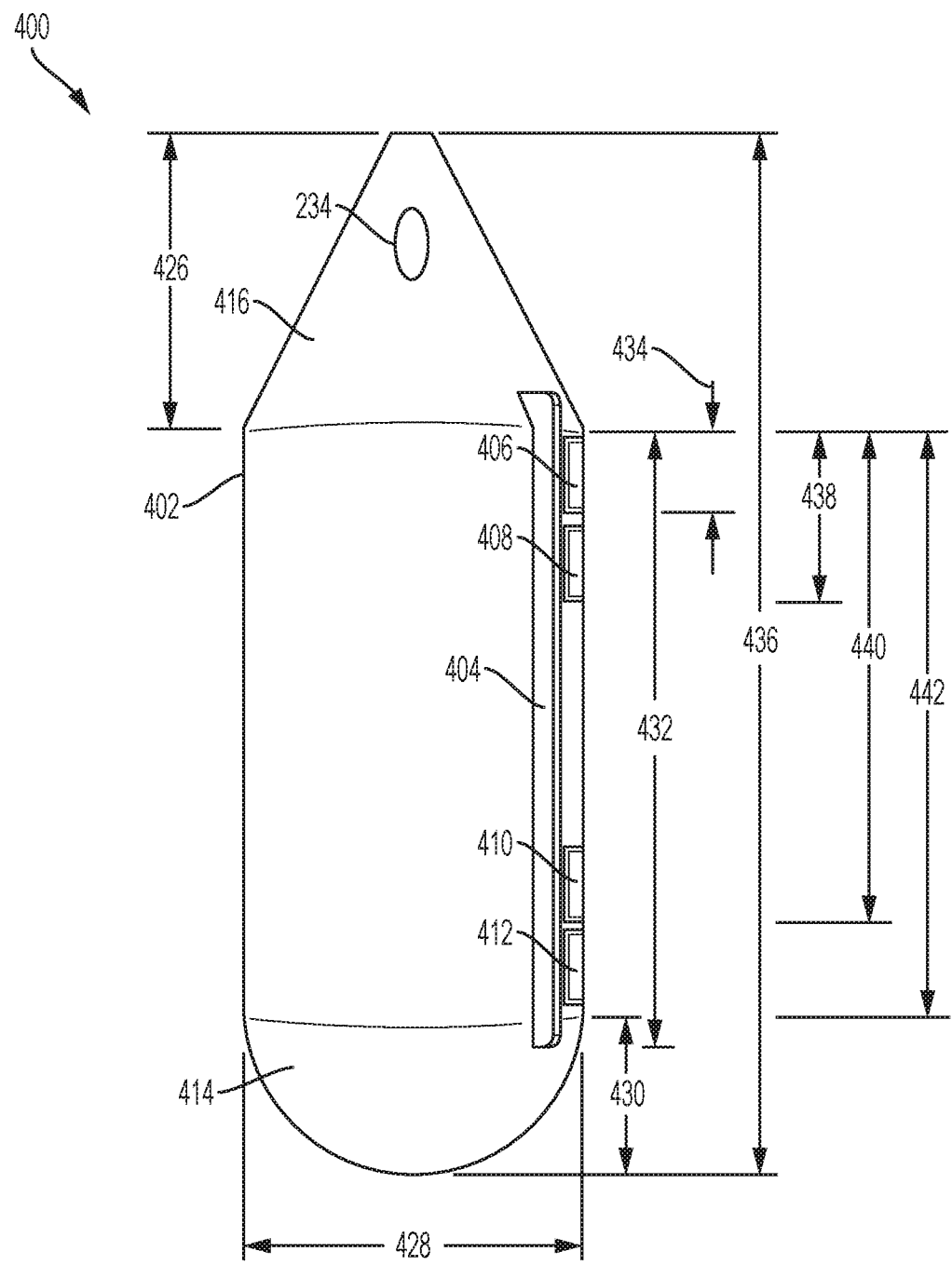
FIG. 4B is a side perspective view of a system for acquiring seismic data, in accordance with an embodiment.

FIG. 4B is a side perspective view of a system for acquiring seismic data, in accordance with an embodiment. The system 400 can have the following dimensions: a diameter or width 428 of the ballast 414 or case 402 can range, for example, from 3 feet to 6 feet. The diameter or width 428 can be 4 feet, 4.5 feet, or 5 feet, for example. The height 436 can correspond to the height of the system 400 with the cap 416, case 402 and the ballast 414. The height 436 can range from 10 feet to 20 feet, for example. The height 436 can be 12 feet, 13 feet, 14 feet, 15 feet, or 16 feet. The height 432 can correspond to a height of the runner 404. The height 432 can range from 6 feet to 15 feet, for example. The height 432 can be 8 feet, 9 feet, or 10 feet, for example. The height 430 can correspond to a height of the ballast 414, and can range, for example, from 1 foot to 4 feet. The height 430 can be 1 feet, 2 feet, or 3 feet, for example. The height H13 can correspond to a height of the case 402. The height H13 can range from 6 feet to 15 feet, for example. The height H13 can be 8 feet, 9 feet, or 10 feet, for example. The height 426 can correspond to the height of the cap 416. The height 426 of the cap can range from 1 foot to 5 feet, for example. One or more dimensions of the system 400 can be greater than a corresponding dimension in system 200 because system 400 can include two or more conveyors provided within the case 402, as compared to a single conveyor provided in case 202 of system 200. The system 400 can include one or more fins and one or more beacons 234.

A distance 434 between opening 406 and cap 416 can be less than a distance 438 between opening 408 and cap 416.

The distance 438 can be less than a distance 440 between opening 410 and the cap 416. The distance 440 can be less than a distance 442 between the opening 412 and the cap 416. In some embodiments, the distance 434 and the distance 438 can be the same. In some embodiments, distance 440 and 442 can be the same.

Figure 4C:
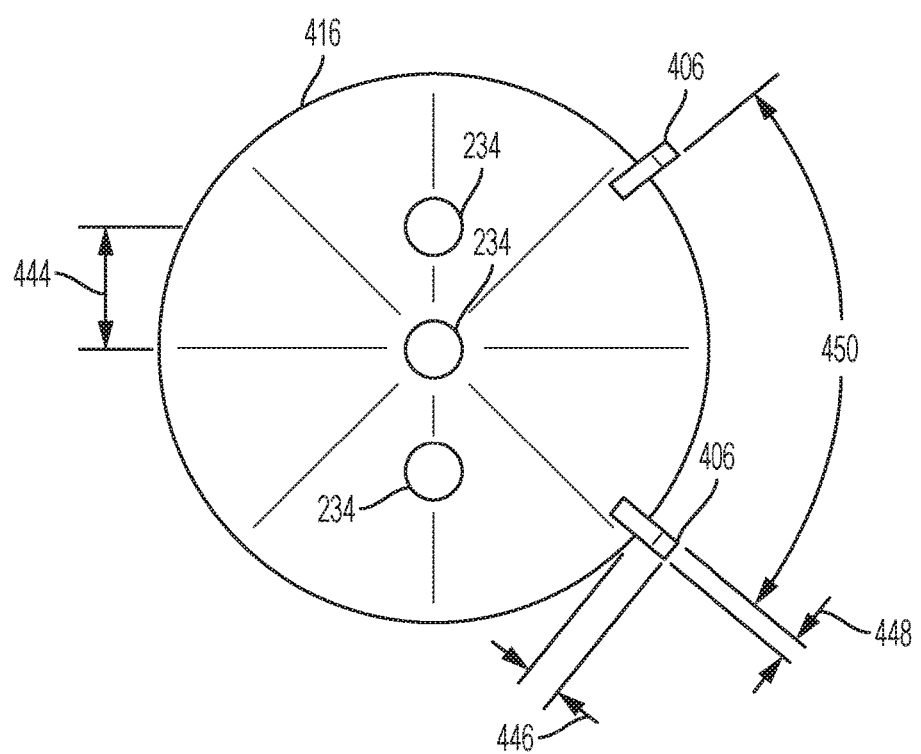
FIG. 4C is a top perspective view of a system for acquiring seismic data, in accordance with an embodiment.

FIG. 4C is a top perspective view of a system for acquiring seismic data, in accordance with an embodiment. As illustrated in the top view, a predetermined angle 450 between fins or runners can range, for example, from 50 degrees to 110 degrees. For example, the predetermined angle between the fins or runners can be 60 degrees, 70 degrees, 77 degrees, or 85 degrees. The predetermined angle 450 can be less than the predetermined angle 210 because system 400 may have a larger case which may have a larger cross-section area that produces greater drag force, and thus may generate drag force to dampen rotation with an angle 450 that is less than angle 210.

The thickness 448 of a fin or runner can be the same or different from thickness 256. For example, thickness 448 can be 2 inches, for example. The length 446 can correspond to the extent the fin or runner protrudes from cap 416 or case 402, and can be the same or similar to length 254. For example, 446 can be 3.5 inches. The length 444 can correspond to a length or distance between two beacons 234. The length 444 can range from 0.5 feet to 2 feet or the diameter of the case 402. For example, the length 444 can be 1 foot.

Figure 5:
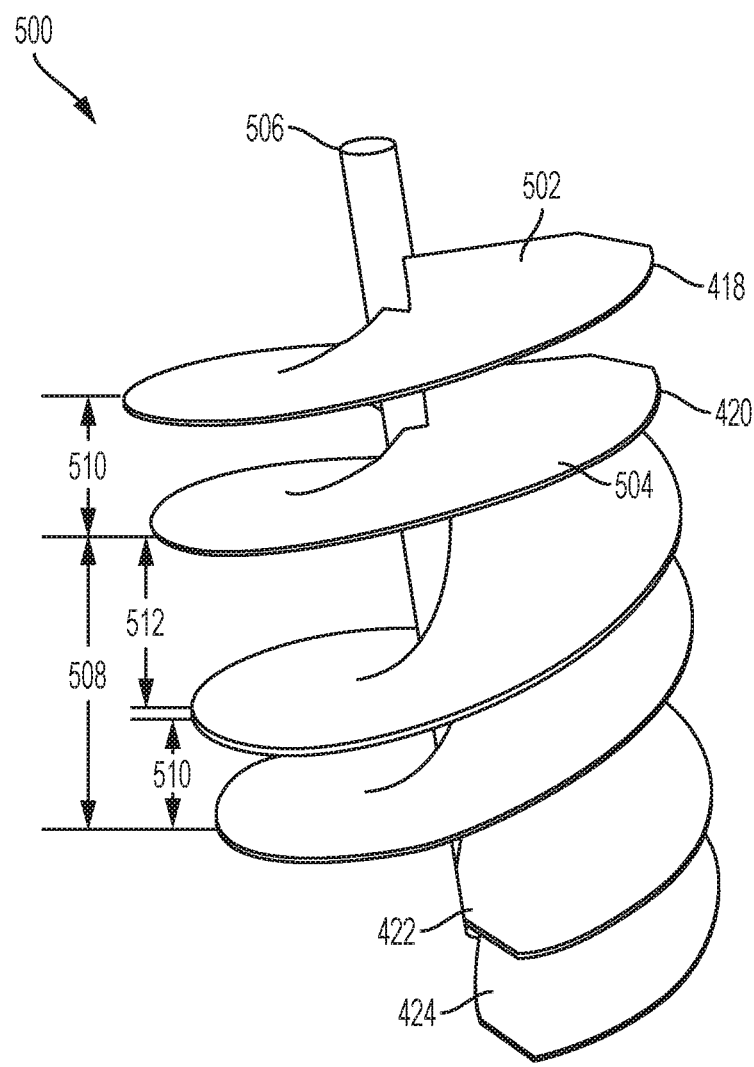
FIG. 5 illustrates multiple conveyors provided for the system for acquiring seismic data, in accordance with an embodiment.

FIG. 5 illustrates multiple conveyors provided for the system for acquiring seismic data, in accordance with an embodiment. The conveyor system 500 can include a first conveyor 502, a second conveyor 504, and a support structure 506. The conveyor system 500 can include more than two conveyors and up to, for example, 3, 4, 5, 6, or more conveyors. A first conveyor 502 and a second conveyor 504 can be provided within case 402. The multiple conveyors 502 and 504 can include one or more component, function, feature of conveyor 302. The conveyors 502 and 504 can have the same or similar dimensions as conveyor 302, have larger dimensions or smaller dimensions. A support structure 506 can be provided within the case 402. The support structure 506 can be the same as or include one or more function, material, or feature as support structure 226.

The one or more conveyors 502 and 504 can have the same or similar spiral pitch. The spiral pitch can be similar to spiral pitch of conveyor 302, or greater than the spiral pitch of conveyor 302. For example, the spiral pitch of conveyors 502 and 504 can be 20 inches, 24 inches, 30 inches, 36 inches, 40 inches or greater. The spiral pitch of conveyor 502 can be D8. The spiral pitch of conveyor 504 can be 508. The distance between conveyor 502 and 504 can be 510. The distance between the conveyors 510 can be sufficient to allow an OBS node to pass through the conveyor. For example, the distance 510 can be greater than a height of the OBS node, such as 5 inches, 10 inches, 15 inches, or 24 inches. The distance 512 can refer to a distance between a first turn of conveyor 504 and a second turn of conveyor 502, where conveyor 502 is a top conveyor and conveyor 504 is a bottom conveyor. The distance 512 can be greater than distance 510.

Figure 6A:
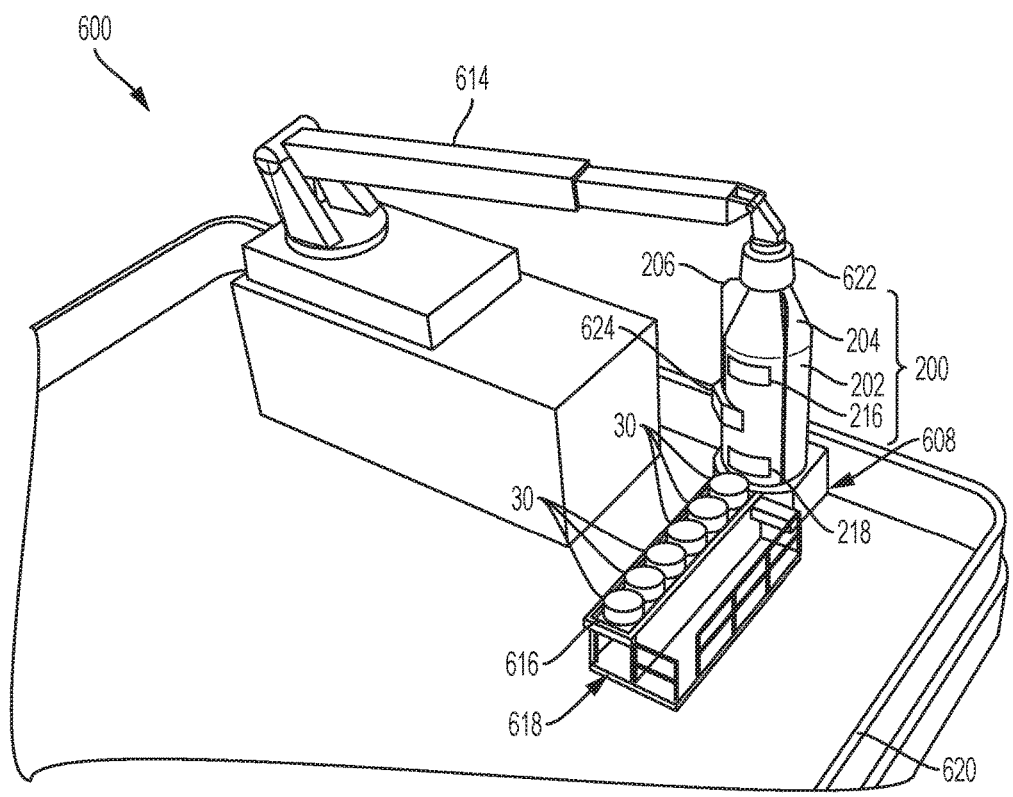
FIG. 6A illustrates a system to transfer units to or from a case in accordance with an embodiment.

FIG. 6A illustrates a system to transfer units to or from a case in accordance with an embodiment. The system 600 can be configured or constructed to use a conveyor 616 to load OBS nodes 30 into a transfer system 200 via opening 216, or remove or receive nodes 30 from transfer system 200 via a second opening 218. The transfer system 200 can include or refer to system 200, 300, 400 or 500. A crane 614 (e.g., crane 25A) can support or hold transfer system 200 in a vertical position or substantially vertical position via coupling mechanism 622. A receptacle or base 608 can support the transfer system 200. The conveyor 616 can be positioned on an elevator 618 to raise or lower the conveyor 616 with an opening 216 or 218 of the transfer system 200. In some embodiments, the system 600 can be used in a marine environment on a vessel 620.

The crane 614 can be configured, calibrated and constructed to support transfer system 200, raise transfer system 200, lower transfer system 200 into an aqueous medium, and maintain the case in the aqueous medium. The crane 614 can include a winch configured to provide heave compensation. For example, the winch speed can range from 0 miles per hour (mph) to 7 mph. The heave compensation can range from 1 $m/s^2$ to 3 $m/s^2$. In some embodiments, the winch speed can be 4.5 mph (such as approximately 4.5 mph with a variation of plus or minus 1 mph) and the heave compensation can be 1.8 $m/s^2$ (such as approximately 1.8 $m/s^2$ with a variation of plus or minus 0.5 $m/s^2$).

The crane 614 can be configured to carry a load of at least 1000 kg. The crane 614 can be configured to carry a payload of 1500 kg at 3000 meters. The crane 614 can include an electric motor, such as a 250 kW-440 v/60 Hz motor. The crane 614 can be configured to lower the transfer system 200 to an ocean bottom, ocean seabed, or ocean floor. The crane 614 can be configured for mid-water docking between the transfer system 200 and an underwater vehicle. For example, a mid-water position in the water column can include or refer to a location 50 to 1000 meters above a seabed, and can vary based on a flatness of the seabed so as not to damage the case 202. The crane 614 can provide heave compensation to facilitate the mid-water docking.

The crane 614 can include a coupling mechanism 622 configured and constructed to hold a portion of the transfer system 200. The coupling mechanism 622 can include a suction mechanism, alignment notches, or a cable connected to the transfer system 200 and the crane 614.

The transfer system 200 can include one or more component, feature, function or material of system 200 or system 400, including, for example, case 202, cap 204, ballast 228, one or more conveyors 302, support structure 226, one or more fins 206 and 208, or one or more runners 230 and 232. The transfer system 200 can include a case 202 (e.g., case 202 or 402) with one or more openings 216 or 218. A cap 204 can be adjacent to the case 202. The transfer system 200 can include one or more first conveyors (e.g., conveyor 302, 502, or 504) provided within the case 202. The transfer system 200 can include one or more fins 206 and one or more runners.

The system 600 can include one or more second conveyors 616 external to the case 202. The second or external conveyors 616 can be configured and constructed to deposit or transfer nodes into case 202, or receive or retrieve nodes from case 202. The external conveyor 616 can include rollers, a belt, pneumatic conveyor, vibrating conveyor, flexible conveyor, lubricated conveyor, gravity skatewheel conveyor, wire mesh conveyor, plastic belt conveyor, chain conveyor, electric track vehicle conveyor, spiral conveyor, screw conveyor, or a drag conveyor. The external conveyor 616 can open or close a gate (e.g., gates 224 or 226) that close or obstruct an opening 216 or 218. For example, the external conveyor 616 can include an arm or lever configured to open or activate the gate on the case 202. The external conveyor 616 can open the gate to load or unload nodes 30, and close the gate after loading or unloading the nodes 30.

The conveyor 616 can include or be placed on an elevator 618. The elevator 618 can be configured to raise or lower the external conveyor 616 to align an end of the external conveyor 616 with opening 216 or 218. The external conveyor 616 aligned with an opening of the case 202 can turn on, drive, or otherwise initiate conveyance to load or unload units 30 into or out of the case 202. For example, the elevator 618 configured to position the second conveyor to align the second conveyor with the first opening. The elevator 618 can include a traction elevator, hydraulic elevator, lift, mechanical lift, electromechanical lift, hydraulic lift, or manual lift. For example, the lift can include a jack or mechanical jack configured with a screw thread for lifting the conveyor 616.

The conveyor 616 can raise or lower to align with multiple openings of the case 202 to load nodes 30 into the case 202. For example, the transfer system 200 can include multiple conveyors in a double helix structure. The external conveyor 616 can align with a first opening corresponding to a first internal conveyor provided within the case 202, and transfer a first set of nodes onto the first internal conveyor. The external conveyor 616 can then align with a second opening corresponding to a second internal conveyor provided within the case 202, and transfer a second set of nodes onto the second internal conveyor. The external conveyor 616 can be a powered conveyor. The internal conveyors can be unpowered.

The system 600 can include a base 608. The base 608 can include a support arm 624. The support arm 624 can at least partially wrap around the case 202 to support the case 202 in a substantially vertical position (e.g., plus or minus 20 degrees from vertical). The base 608 and support arm 624 can be used to support the transfer system 200 on the vessel 620. In some embodiments, the base 608 or support arm 624 can support the transfer system 200 on a seabed. For example, the case 202, or bottom cap or ballast of the transfer system 200 can be at least partially inserted into the base 608, coupled to base 608, attached to base 608, or otherwise removably or irremovably connected to base 608. The crane 614 can lower the transfer system 200 along with base 608 and support arm 624 to through the aqueous medium to the seabed, and place the base 608 in contact with the seabed such that the base 608 is attached, in contact with, placed on or otherwise connected to the seabed. The base 608 can be configured to support the transfer system 200 in a substantially vertical manner on the seabed.

Figure 6B:
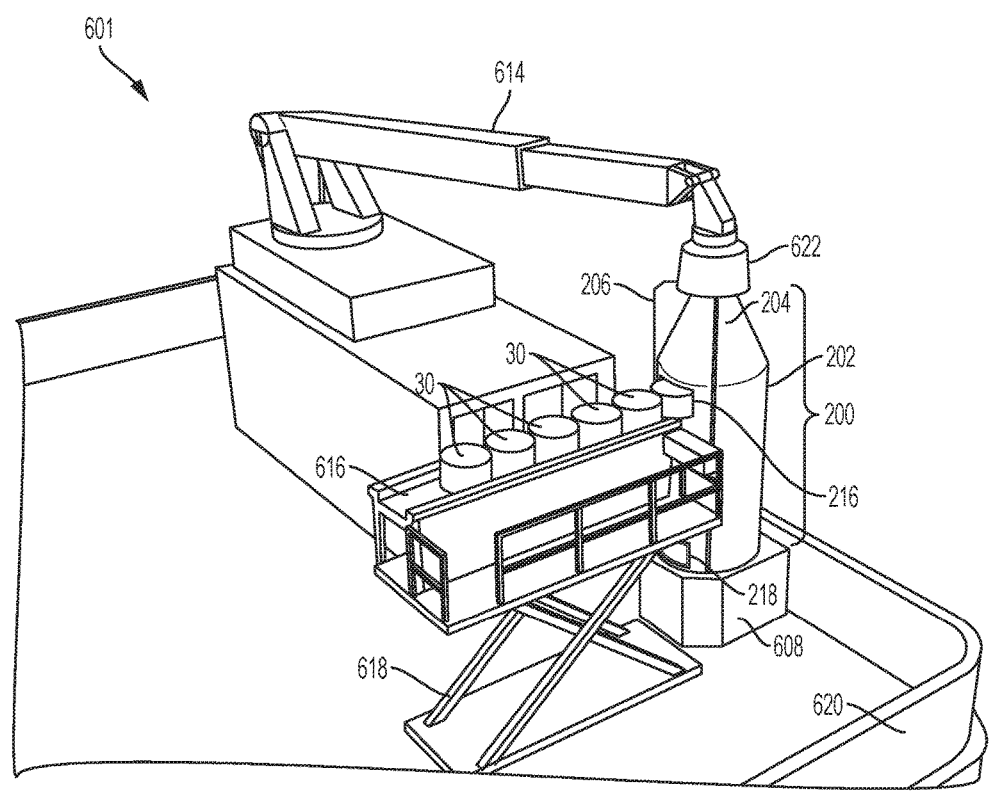
FIG. 6B illustrates a system to transfer units to or from a case in accordance with an embodiment.

FIG. 6B illustrates a system to transfer units to or from a case in accordance with an embodiment. The system 601 illustrates the elevator 618 raising the external conveyor 616 to align an end of the external conveyor 616 with an opening 216 of the case 202. The external conveyor 616 can be operational to transfer, move, or otherwise provide one or more nodes 30 to the internal conveyor within the case 202. In this example, the elevator 618 includes a mechanical jack elevator 618.

FIG. 7 illustrates a system to transfer units to or from a seabed in accordance with an embodiment. The system 700 can include one or more system, component, element, feature or function of FIGS. 1-6B. The system 700 can include the transfer system 200 coupled to a crane 614 via a coupling mechanism 622 and a cable 702. The cable 702 can include any type of cable capable of supporting or carrying transfer system 200 when the transfer system is loaded with one or more nodes 30. For example, cable 702 can include or correspond to cable 46A or cable 44A. The cable 702 can be coupled to the crane 614 (e.g., winch) and the transfer system 200 (e.g., via a cap of the transfer system 200). The crane can be configured to raise, lower, or support the case via the cable. For example, the crane 614 can include a winch conferred to roll out the cable 702 to lower the transfer system 200 into an aqueous medium, lower the transfer system 200 onto a seabed, lower the transfer system 200 into a water column, maintain the transfer system 200 at a level in the aqueous medium that is below the surface of the water and above the seabed.

The crane 614 can lower the transfer system 200 into the aqueous system such that the fins 206 of the transfer system 200 create force as the transfer system 200 moves through the aqueous medium to dampen rotation of the case. For example, the crane 200 can orient the transfer system 200 in the aqueous medium such that the fins 206 extend in a direction opposite the direction of motion. The vessel 620 can move in a first direction, while crane 614 can tow the transfer system 200 behind the vessel 620. The fins 206 can face a second direction that is opposite the first direction in which the vessel moves. In some embodiments, the crane 614 lowers the transfer system 200 into the aqueous medium, and the transfer system 200 automatically orients itself such that the fins 206 extend in the second direction. For example, the fins 206 can create a drag force that control rotation of the transfer system 200 to rotate the transfer system 200 to a predetermined orientation relative to motion of the vessel 620, and then dampen, minimize, or stabilize rotation such that the transfer system 200 maintains the predetermined orientation relative to motion of the vessel 620.

Figure 8A:
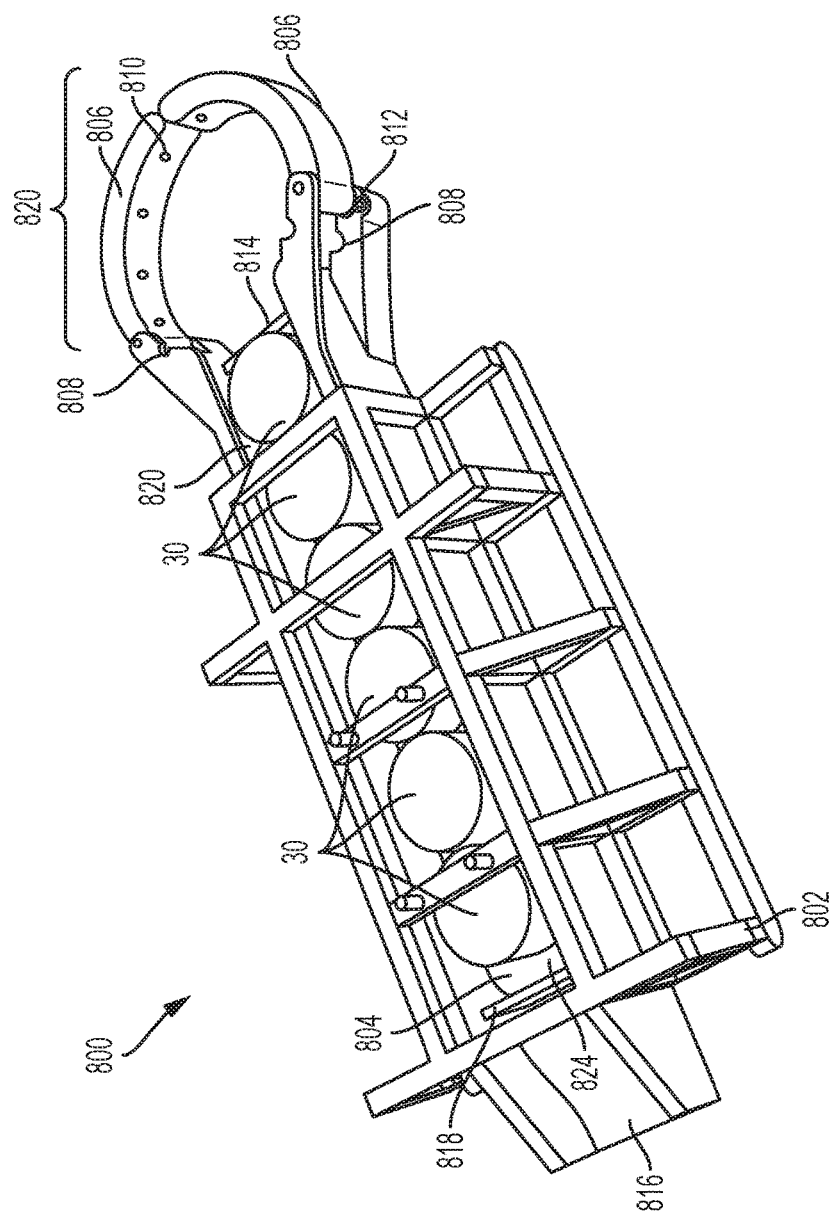
FIG. 8A illustrates a skid system to acquire seismic data from a seabed in accordance with an embodiment.

FIG. 8A illustrates a skid system to acquire seismic data from a seabed in accordance with an embodiment. The system 800 can include a frame 802 or housing 802 containing a conveyor 804 that supports or holds one or more nodes 30. The system can include a storage compartment 40. The system 800 can include a capture appliance 820 configured, constructed and operational to capture or hold a case (e.g., case 202 or 402) or transfer system (e.g., 200, 400, or 200) that can store one or more nodes 30. The capture appliance 820 can include one or more arms 806, one or more notches 808, one or more pin holes 810, and an actuator 812 that can open or close the one or more arms 806. The system 800 can include a ramp 816 that can deploy the nodes 30 on the seabed or otherwise connect or place the nodes 30 on the seabed. The system 800 can include a gate 818 that can obstruct or prevent the nodes 30 from inadvertently being deployed onto the seabed. One or more component, function or feature of system 800 can be operated autonomously or manually by an operator. For example, an operator on vessel 820 can communicate with a component of system 800 and instruct system 800 to perform a function.

The system 800 can include a frame 802, housing 802 or skid structure 802. The housing 802 can include a frame 802 or skid structure 802. The housing 802 or skid structure 802 can support or elevate the conveyor 804, for example, on or above the seabed. The housing 802 can be designed and constructed to be in contact with the seabed. The housing 802 can include a frame structure, solid structure, or porous structure. In some embodiments, the housing 802 can include a continuous, solid housing. The housing 802 can include one or more materials that are similar or different to the materials used in the case. The materials can include, e.g., plastics, metals, alloys, lead, iron, or cement. In some embodiments, the housing 802 can be ballasted or weighted. The housing 802 can contain nodes 30 such that the nodes 30 can enter and exit the housing through an opening at an end of conveyor 804.

The system can include a conveyor 804 that supports or holds one or more nodes 30. The conveyor 804 can be provided within housing 802. The housing 802 can hold or support conveyor 804. The conveyor 804 can be mechanically coupled to the housing 802, or be in contact with the housing 802. The conveyor 804 can include a powered conveyor. The conveyor 804 can include rollers, a belt, pneumatic conveyor, vibrating conveyor, flexible conveyor, lubricated conveyor, gravity skatewheel conveyor, wire mesh conveyor, plastic belt conveyor, chain conveyor, electric track vehicle conveyor, spiral conveyor, screw conveyor, or a drag conveyor. The conveyor 804 can include a first end 822 and a second end 824. The first end 822 can be closer to the capture appliance 820 than the second end 824. The second end 824 can be closer to the ramp 816 than the first end 822. The first end 822 and second end 824 can be on opposite ends of the conveyor 804. The first end 822 can receive nodes 30 from a case held by capture appliance 820. The first end 822 can provide nodes to the case held by the capture appliance 820. The second end 824 can provide nodes to the ramp 816 for deployment on the seabed. The second end 824 can receive nodes from the seabed. The conveyor 804 can be operated in a forward motion or a reverse motion to direct nodes 30 towards the first end 822 or towards the second end 824.

The system 800 can include a capture appliance 820 configured, constructed and operational to capture or hold a case (e.g., case 202 or 402) or transfer system (e.g., 200, 400, or 200) that can store one or more nodes 30. The capture appliance 820 can include one or more arms 806, one or more notches 808, one or more pin holes 810, and an actuator 812 that can open or close the one or more arms 806. The actuator 812 can open the arms 806 such that the case 202 can be released from the capture appliance 820. Opening the arms 806 can include or refer disengaging the arms 806, disengaging the case 202, releasing the arms, releasing the case 202, separating the arms 806, or removing the arms 806 from the case 202. For example, the actuator 812 can open the arms fully or 100% or partially (e.g., 80%, 70%, 60%, 50%, 30%, 10%). The actuator 812 can close the arms 806 to capture or hold the case 202. Closing the arms 806 can include or refer to engaging the arms 806, engaging the case 202, grasping the arms 806, grasping the case 202, putting the arms 806 in a holding position, capturing the case 202, or moving the arms 806 into a position to hold the case 202. For example, the actuator 812 can fully close the arms 806 (e.g., 100% closed) or partially close the arms (e.g., 80%, 70%, 60%, 50%, 30%, 10%). The one or more arms 806 can include radial arms, robotic arms, circular arms, a lever, or a clamp. The arms 806 can include or be made from, for example, one or materials used to make the case 202, or one or more different materials.

In some embodiments, the capture appliance 820 includes a single arm 806 that can extend around a case holding nodes 30 and hold the case. In some embodiments, the capture appliance 820 includes two arms 806 that each partially extend around the case in order to securely hold the case. Securely holding the case can include holding the case in a relatively fixed position such that an opening of the case is in alignment with conveyor 804 and nodes can either be loaded or unloaded to or from the conveyor 804 and the case.

The capture appliance 820 can include an actuator 812 that can open or close the one or more arms 806. The actuator 812 can include a hydraulic actuator, pneumatic actuator, electric actuator, or mechanical actuator. The actuator 812 can be coupled to a lever, pulley system or hinge that can move the one or more arms 806 from an open position to a closed position. In some embodiments, the actuator 812 can include a spring mechanism that defaults to an open position. By having a mechanical tension system that defaults to an open position, should there be an error or failure in system 800 (e.g., due to power failure, communication failure, component failure), the arms will return to the default position of open, and the case can be released from the arms 806 and allowed to return to the vessel 820. For example, responsive to power failure, locking pins on the capture appliance or arms can spring back and the case 202 can be pulled by the crane up and out of the closed arms for separation.

The capture appliance 820 can open or close both arms 806 at the same time, at substantially the same time or at different times. The capture appliance 820 can include a single actuator that controls both arms 806 so their open or close state is synchronized. The capture appliance 820 can include a first actuator for the first arm, and a second actuator for the second arm. The first and second actuators can be operated or controlled to synchronize the opening or closing of the arms. Upon closing the arms, the capture appliance 820 can engage a locking mechanism such as pins or a latch to keep the arms in a closed position around the case 202.

The capture appliance 820 can include an alignment mechanism 808. The alignment mechanism 808 can hold or direct the case to a predetermined orientation, such as an orientation in which an opening of the case is in alignment (e.g., substantial alignment) with the first end 822 of the conveyor in order to load or unload nodes 30 to or from the case from or to the conveyor. The alignment mechanism 808 can include, for example, one or more notches, fins, runners, protrusions, knobs, stoppers, detents, or buttons. The alignment mechanism 808 can be mechanical, powered, or unpowered. For example, the alignment mechanism 808 can be gravity-driven.

In some embodiments, the alignment mechanism 808 includes one or more notches 808. The notches 808 can be used to align an opening of a case with a first end 822 of the conveyor 822. For example, the notches 808 can receive a protrusion from a case. The protrusion can be positioned on the case such that when the protrusion is in alignment with the notch 808, an opening of the case is in alignment with the first end of the conveyor 822. The notch 808 can include an indent, inversion, or a concave portion. The notch 808 can include a tapered notch, circular notch, hemispherical notch, rectangular notch, triangular notch, trapezoidal notch or a stepped notch. For example, a tapered notch can be wider at the entrance of the notch and narrower at an in internal portion of the notch. In some embodiments, the alignment mechanism 808 can include the protrusion on the capture appliance 820, while the notch is on the case.

The alignment mechanism 808 can include a single notch 808 or multiple notches 808. The alignment mechanism 808 can include acoustic receivers, optical detectors, light sensors, transmitters, or other transducers that can receive or transmit signals from or to the case to identify a location or orientation of the case.

In some embodiments, the alignment mechanism 808 can include a first retaining ring on the case 202. The ring can be installed at a downward angle that points to an opening of the case opening. The capture appliance can include a second angled ring configured to mate with the first angled ring on the case. The first and second rings can be configured and angled such that gravity can facilitate aligning a bottom point of the case with the receiving end of the capture appliance or conveyor external to the case. For example, a base of the case can have a conical shape with the titled ring or a ball-bearing raceway encircling the case. The conical or cone base can be lowered into the capture appliance. As the conical base slides into the second ring of the capture appliance, the base can engage with the capture appliance and orient by gravity. For example, the base can be ballasted such that the weight at a lower edge of a tilted ring can cause the case to orient and come into alignment.

In some embodiments, the alignment mechanism 808 can include an actuator or motor to move the ring to align an opening with the conveyor. The ring can move via ball-bearings, rollers, gears, a belt or chain. In some embodiments, the alignment mechanism 808 can include rotating the case until it locks into alignment via a protrusion, latch, clamp or other stopper. In some embodiments, the alignment mechanism 808 can include a carousel that rotates the case into alignment, where alignment can include or refer to aligning an opening of the case with a conveyor external to the case.

The capture appliance 820 can include one or more pin holes 810. The pin holes 810 can receive pins or protrusions from the case when the capture appliance 820 holds the case. The pin holes 810 can capture or hold the case in a stable manner such that the case does not substantially move (e.g., plus or minus 1" vertical, horizontal or rotational movement).

The system 800 can include a deployment appliance 816, such as a ramp 816 that can deploy the nodes 30 on the seabed or otherwise connect or place the nodes 30 on the seabed. The ramp 816 can be positioned at the second end of the conveyor. In some embodiments, the ramp 816 can be an unpowered gravity ramp, and the conveyor 824 can directed OBS nodes 30 towards the ramp 816 so the nodes slide down the ramp and contact the seabed. The length of the ramp 816 can range from 1 foot to 10 feet. The angle of decent of the ramp 816 can range from 30 degrees to 70 degrees.

The system 800 can include one or more deployment appliances 816 or different types of deployment appliances 816. For example, the deployment appliance 816 can include a staircase, an escalator, curved slide, robotic arm, conveyor, pulley system, or an arm with a suction cup to place nodes 30 on the seabed.

The system 800 can include a first gate 814 at the first end of the conveyor, and a second gate 818 at the second end of the conveyor. The gates 814 and 818 can obstruct or prevent the nodes 30 from inadvertently being deployed onto the seabed or falling into a case. The gates 814 and 818 can be similar to, or include one or more component or feature of, a gate on the case such as gate 224. The gate 818 can vertically move up or down to open and close. The gates 814 and 818 can swing open and closed along a rotation point of the gate 814 and 818. The gates 814 and 818 can open sideways. The gates 814 and 818 can include or be operated by a gate opener, such as an electric gate opener, mechanical gate opener, hydraulic gate opener, or pneumatic gate opener. The gate 814 at the first end 822 of the conveyor 804 can be configured, constructed and operational to open a gate of the case captured by the capture appliance 820.

FIG. 8B illustrates a different perspective view of the skid system 800 to acquire seismic data from a seabed in accordance with an embodiment. In this perspective view, the capture appliance 820 and arms 806 thereof are in the open positioned. In some embodiments, the open position can correspond to the default position. The first gate 814 can be in the closed position to obstruct or prevent nodes 30 from falling or passing through or past the first end 822 of the conveyor 804.

Figure 8C:
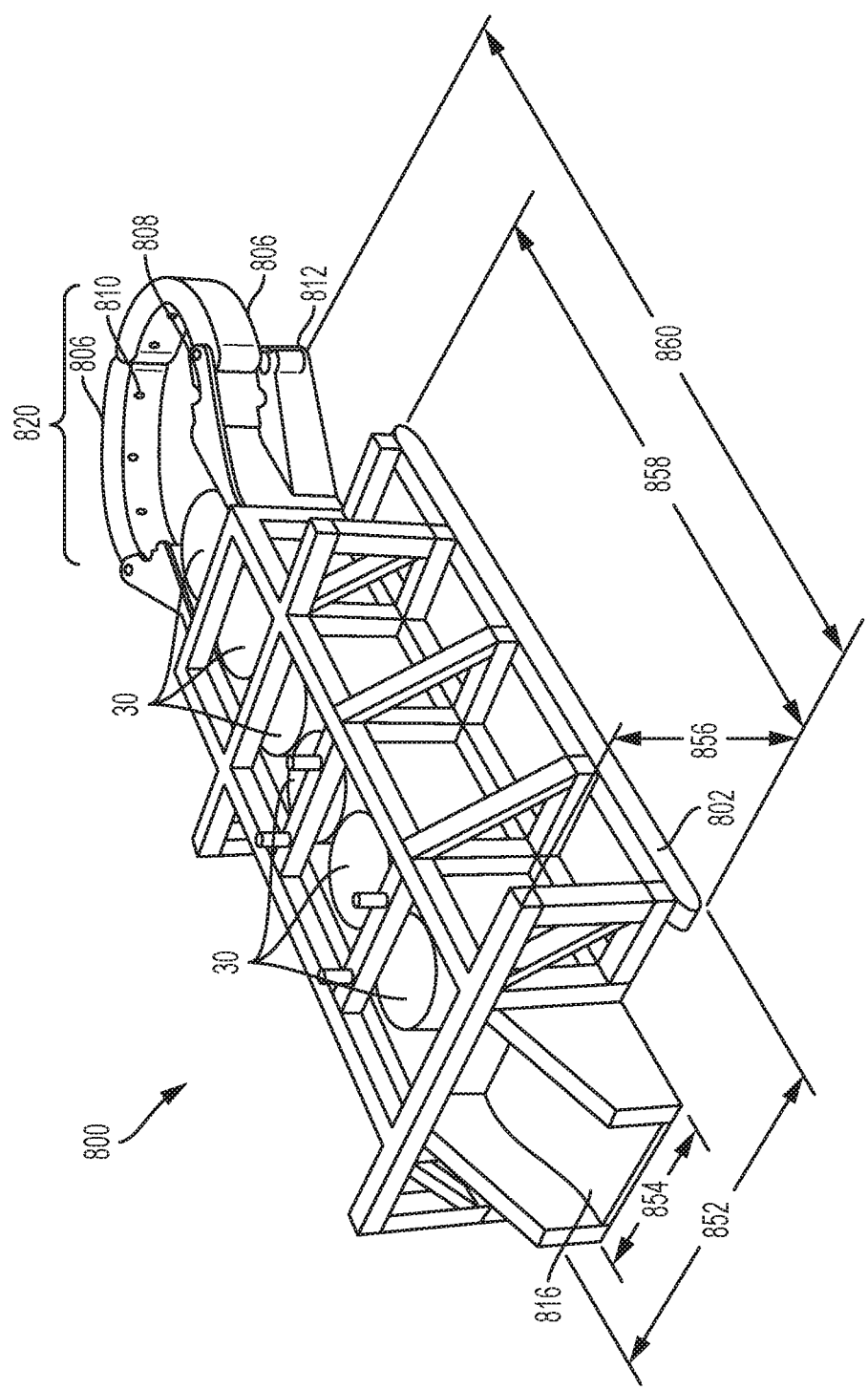
FIG. 8C illustrates a skid system to acquire seismic data from a seabed in accordance with an embodiment.
Figure 9:
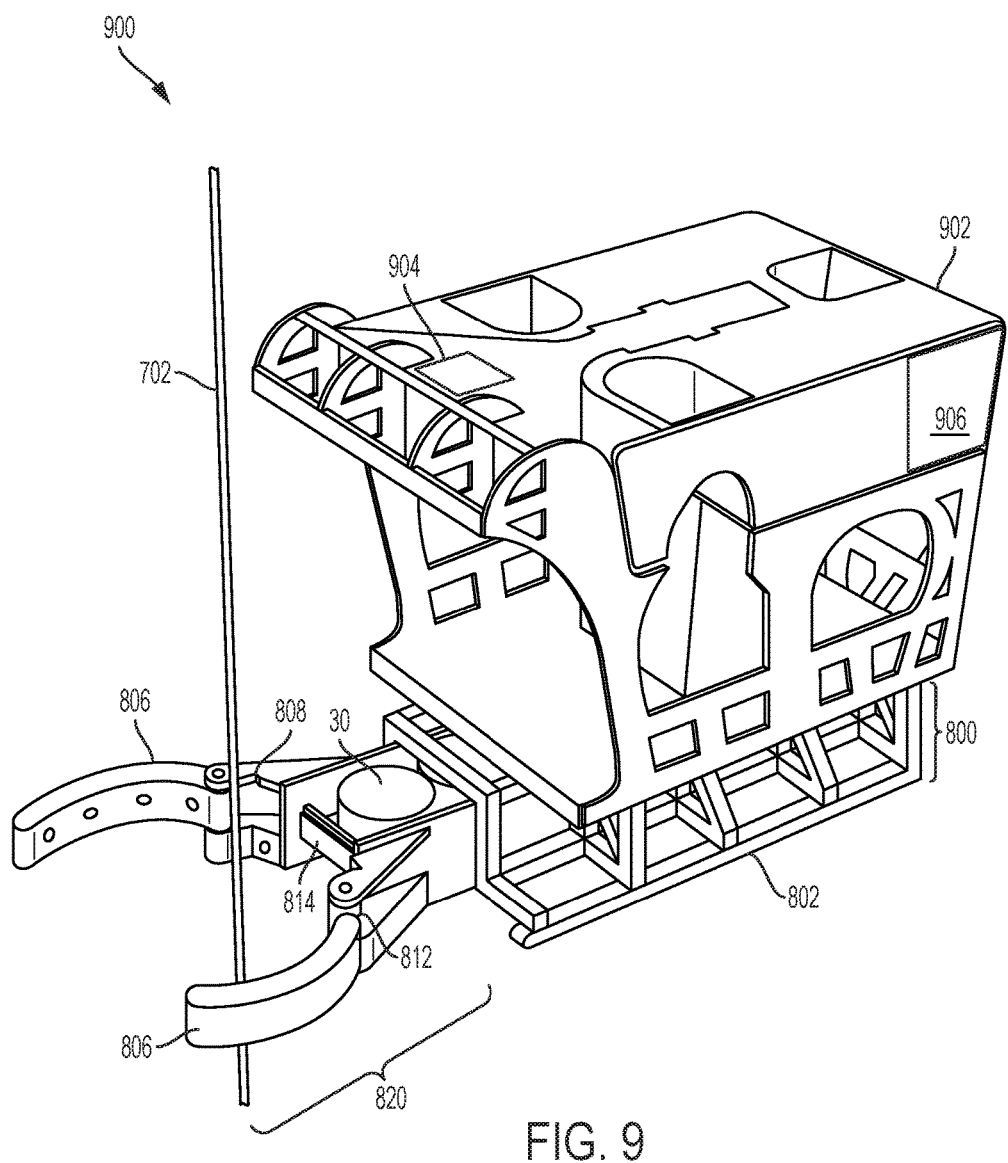
FIG. 9 illustrates a system to acquire seismic data from a seabed, in accordance with an embodiment.

FIG. 8C illustrates the skid system 800 to acquire seismic data from a seabed in accordance with an embodiment. The skid or frame 802 can have a width 852 in the range of 4 feet to 8 feet, for example. For example, the skid 802 can have a width 852 of 4 feet, 5 feet, 6 feet, 7 feet, or 8 feet. The skid structure 802 can have a height 856 in the range of 1.5 feet to 4 feet, for example. The height 856 of the skid structure can be set based on a height of the nodes 30, a number of levels of conveyors or nodes contained in the skid structure 802, or the distance above the seabed the skid 802 is to support the conveyor. The height 856 can include, for example, 2 feet, 2.5 feet, 3 feet, or 4 feet. The skid structure 802 can have a length 858 in the range of 5 feet to 15 feet, for example. The length 858 of the skid structure can include, for example, 6 feet, 7 feet, 9.5 feet, 10 feet, or 11 feet. The length 858 of the skid structure can be set based on a number of nodes 30 to be supported on the conveyor 804. For example, the length 858 of the skid structure can be set to accommodate three nodes, four nodes, five nodes, 6 nodes, 7, nodes, or 10 nodes. The conveyor 804 can have a length 860 in the range of 7 feet to 15 feet, for example. The length 860 of the conveyor can be less than, the same as, or greater than the length 858 of the skid structure. For example, the length 860 of the skid structure can be 13 feet 10 inches, while the length 858 of the skid structure can be 9 feet 8 inches. The conveyor 804 can, thus, extend beyond the skid structure at the first end 822 to facilitate receiving nodes 30 from a case held by the capture appliance 820.

The deployment appliance 816 can have a width 854 in the range of 1 foot to 3 feet, for example. The width of the deployment appliance 816 can be set based on a width of the nodes 30 or other devices deployed via the deployment appliance 816. For example, the width 854 can be 2 feet, 2.5 feet, or 3 feet.

FIGS. 9-13 illustrate a system to acquire seismic data from a seabed. FIGS. 9-13 illustrate a system including a vehicle and case, where the vehicle is configured to capture the case and release the case. System 900 can include a vehicle 902. The vehicle 902 can include, for example, a remotely operated vehicle, autonomously operated vehicle, robot, manually operated vehicle, machine, or submarine. The vehicle 902 can include one or more engine 906, such as a propeller, thruster, motor, or other mechanism to navigate through the aqueous medium (e.g., move up, down, left, right, diagonally, or rotate about an axis of the vehicle 904).

The vehicle 902 can include the skid system 800 depicted in FIG. 8A. The skid system 800 can be coupled or connected to a portion of the vehicle 902. In some embodiments, the skid system 800 can be adjacent to a portion of the vehicle 902. In some embodiments, the skid system 800 can be contained within the vehicle 902. The skid system 800 can be removably or irremovably connected to the vehicle 902. The vehicle 902 and the skid system 800 can be communicatively connected. For example, the vehicle 902 can have access to power. The vehicle 902 can have battery power or receive power via a cable (e.g., from vessel 820). The vehicle 902 can receive communication and control information from the cable (e.g., remotely operated). The vehicle 902 can be autonomous (e.g., preprogrammed to perform one or more functions based on one or more parameters, conditions or events). The vehicle 902 can be communicatively connected with the skid system 800 to control one or more component, element of function of the skid system 800 (e.g., actuate arms, gates, conveyor, or ramp).

The vehicle 902 can include one or more sensors 904. The sensor 904 can include an acoustic sensor, optical sensor, transponder, transducer, receptor, detector, camera, proximity sensor, motion sensor, temperature sensor, ambient light sensor, or any other sensor that can detect a parameter or environment condition. The sensor 904 can be configured to identify a case or transfer system 200. For example, the case can include a beacon that emits an acoustic signal. The sensor 904 can track the acoustic signal and move towards the acoustic signal. The acoustic signal can include an acoustic signature, chirp rate, frequency, or other pattern that facilitates the vehicle 902 identifying, tracing, and locating the source of the acoustic signal (e.g., the transfer system 200).

The sensor 904 can include one or more sensors of different resolution. For example, a first sensor 904 can have a coarse resolution and a second sensor 904 can have greater resolution to fine tune the location. For example, the sensor 904 can detect an acoustic ping to perform a coarse location determination. The ping can be transmitted by the transfer system (e.g., beacon 234) and received by sensor 904. The ping can indicate a position of the underwater vehicle 902 relative to the transfer system 200. The vehicle 902 can use the ping to determine a depth of the vehicle 902 relative to the transfer system 200 or case 202. For example, the sensor 904 can include multiple sensors positioned throughout the vehicle 902 and oriented in different angles. If a sensor 904 located or oriented to receive pings from above the vehicle receives the ping, then the vehicle 902 can determine that the transfer system 200 is above the vehicle 902. If a sensor 904 located or oriented to receive pings from below the vehicle receives the ping, then the vehicle can determine that the transfer system is below the vehicle 902. The sensor 904 or vehicle 902 can include one or more processors to perform signal processing techniques to determine the direction of the source of the ping. The sensor 904 can include a camera to identify the transfer system 200 and align a conveyor of the skid system 800 with an opening of the transfer system 200.

Upon locating the transfer system 200, the vehicle 902 can position the capture appliance 820 above the transfer system 200. The capture appliance 820 can be in an open position. The vehicle 902 can position the capture appliance 820 around the cable 702 such that the cable is substantially (e.g., within 20%) centered in the capture appliance 820. The vehicle 904 can use one or more sensors or controllers to align the capture appliance 820 above the transfer system 200 and around the cable 702.

Figure 10:
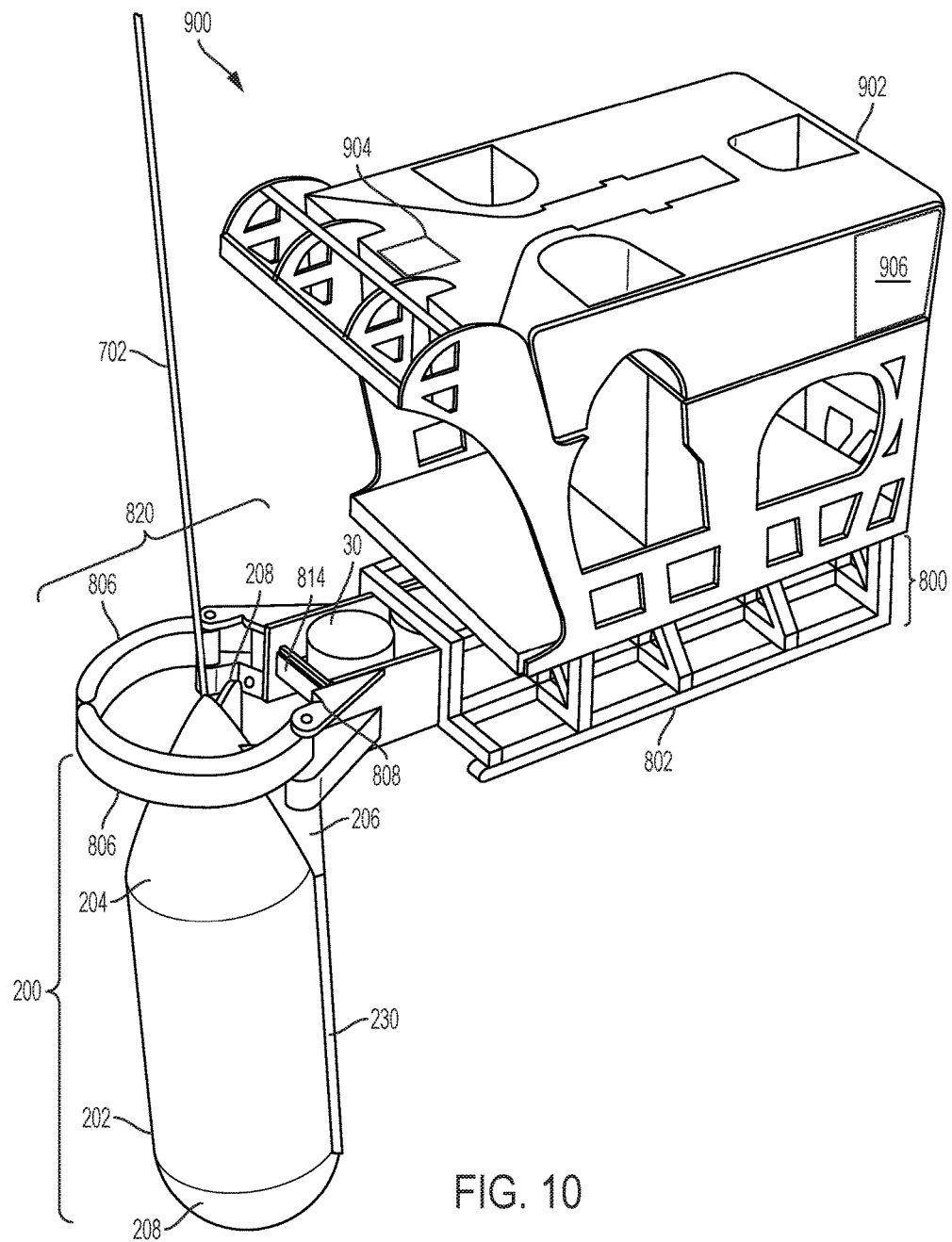
FIG. 10 illustrates a system to acquire seismic data from a seabed, in accordance with an embodiment.

FIG. 10 illustrates the system 900 to acquire seismic data from a seabed. The vehicle 902 can close the capture appliance 820 and move down towards the transfer system 200 (e.g., system 200 or 400). The vehicle 902 can use the one or more sensors 904 to monitor the status of the operation or the orientation of the transfer system 200 relative to the capture appliance 820 or component thereof. If the vehicle 902 determines than the transfer system 200 is not properly oriented relative to the capture appliance 820, the vehicle 902 can use the engine 906 to rotate or move along an axis to orient the capture appliance with the transfer system 200. For example, the vehicle 902 can use the alignment mechanism 806 to align the capture appliance with the transfer system 200.

In some embodiments, the vehicle 902 can include an alignment control system that receives sensor data and automatically aligns the capture appliance with the transfer system. In some embodiments, the vehicle 902 can receive communication signals from a remote operator to rotate or move. The fins 206 or 208 of transfer system 200 can enter into notches 806 of the alignment mechanism. This can facilitate locking, fixing, or stabilizing the orientation of the transfer system 200 relative to the capture appliance 820.

Once the fins 206 or 208 are in the notches 806, the vehicle 904 can continue to move down (e.g., via the runners 230 and 232) to align the skid system 800 with an opening of the transfer system (e.g., first opening 216 or second opening 218).

Figure 11:
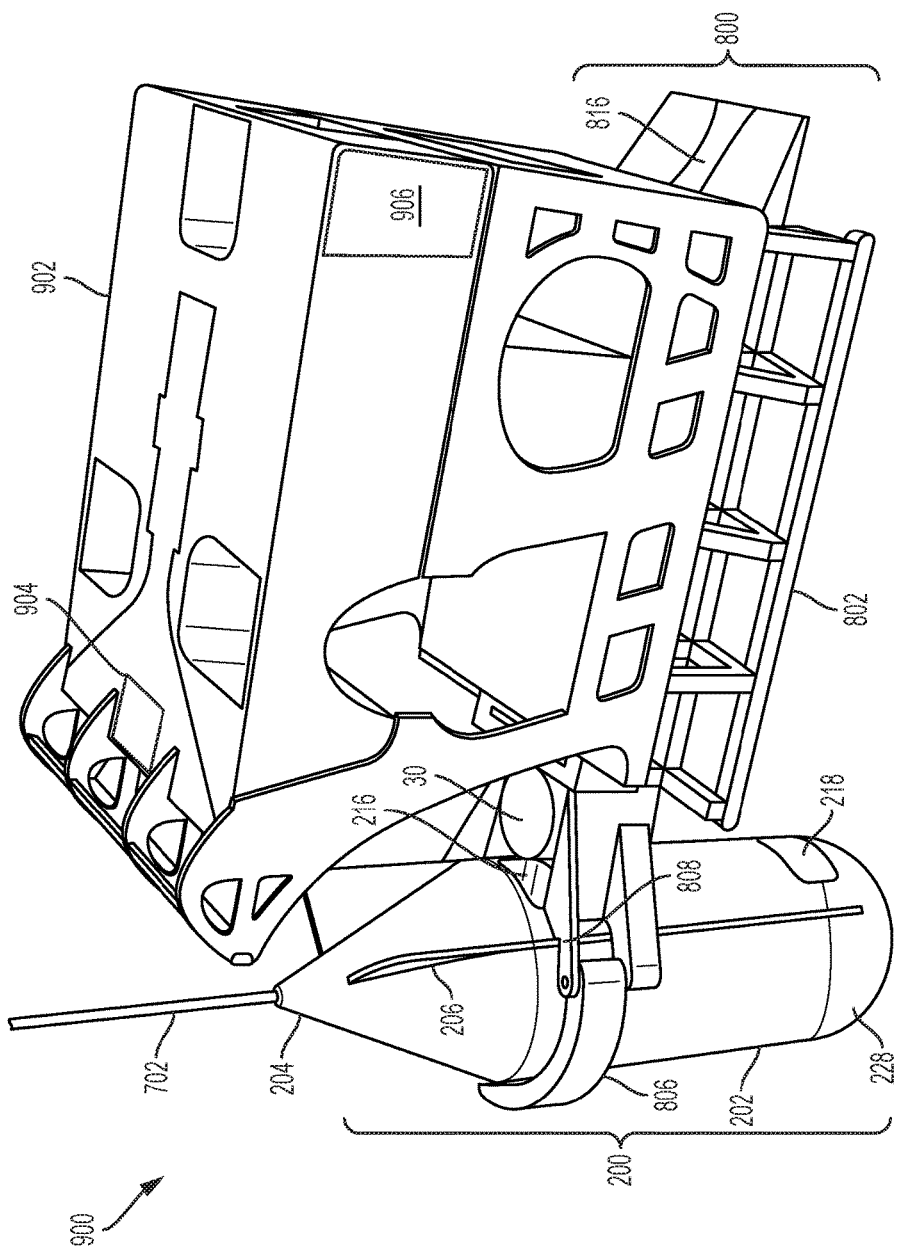
FIG. 11 illustrates a system to acquire seismic data from a seabed, in accordance with an embodiment.

FIG. 11 illustrates the system 900 to acquire seismic data from a seabed. The vehicle 904, upon rotational alignment via the alignment mechanism 806, fins 206, and runner 230, can vertically align the first end 822 of the conveyor 804 with an opening 216 of the transfer system 200. The vehicle 902 can align the conveyor 804 with the top opening 216 to load OBS units 30 into the case. The vehicle 902 can use gate 818 of the skid system 800 to open a gate 224 of the transfer system 200. The vehicle 902 can initiate the conveyor 804 of the skid system to drive or direct OBS nodes towards the first opening 216 and onto the first end 212 of conveyor 302. The capture appliance 820 can hold the transfer system 200 in place during loading of the OBS units 30 into the transfer system 200.

Figure 14:
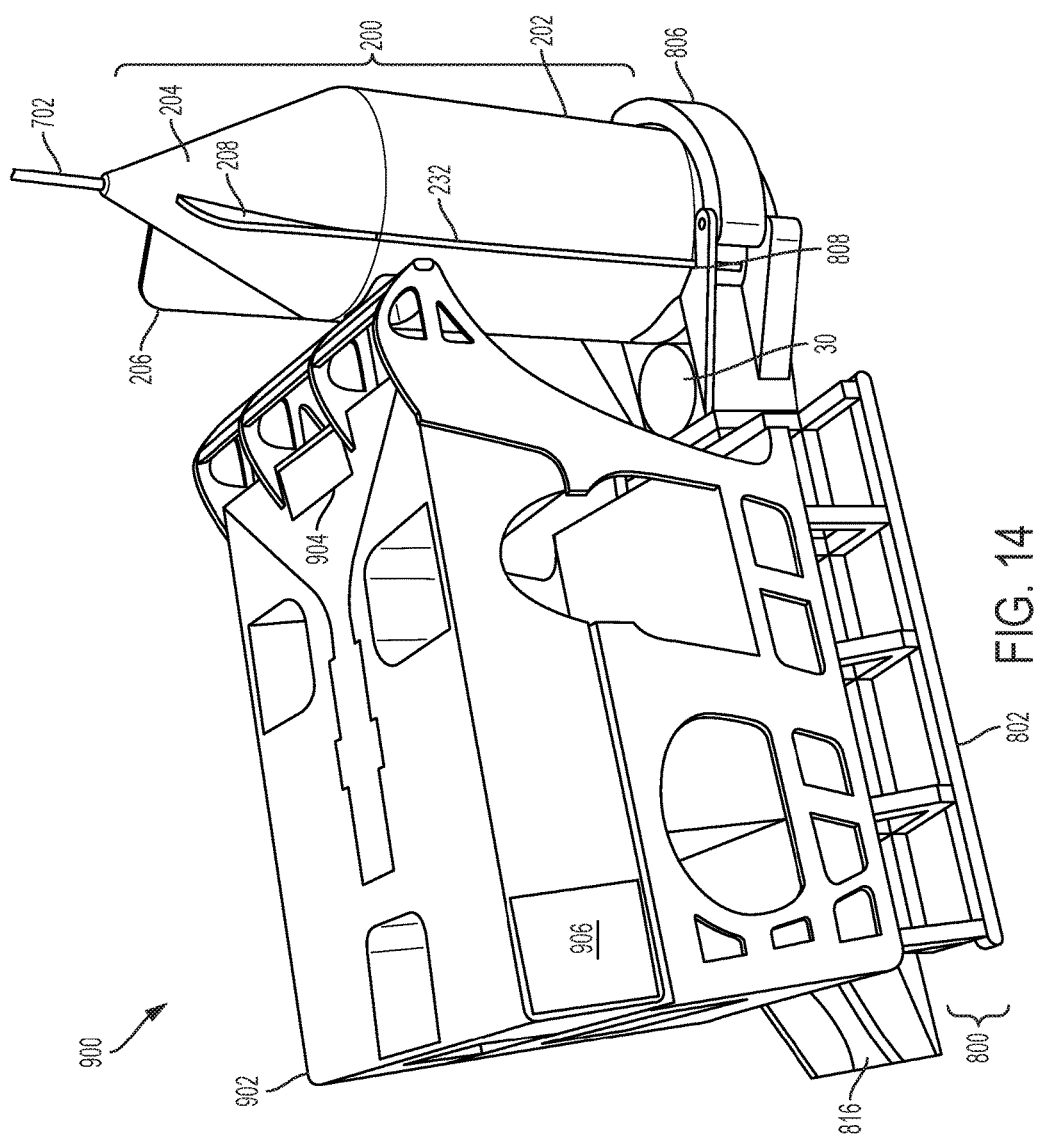
FIG. 14 illustrates a system to acquire seismic data from a seabed, in accordance with an embodiment.
Figure 15:
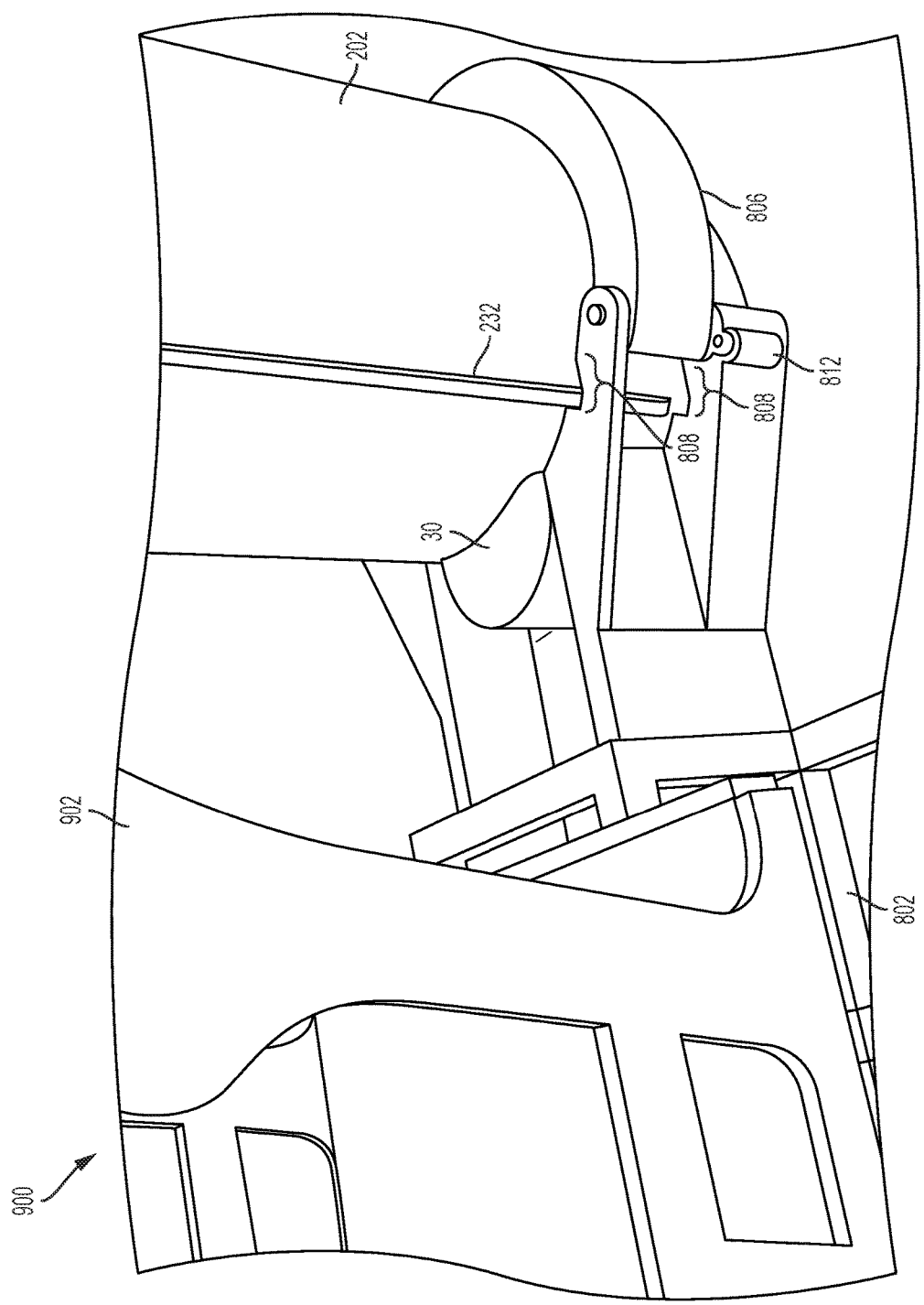
FIG. 15 illustrates a system to acquire seismic data from a seabed, in accordance with an embodiment.

The vehicle 902 can align the conveyor 804 with the bottom opening 218 to receive OBS units 30 from the case, as shown in FIGS. 14 and 15. The vehicle 902 can use gate 818 of the skid system 800 to open a gate 226 of the transfer system 200. The vehicle 902 can initiate the conveyor 804 of the skid system to receive or retrieve OBS nodes from the second end 214 of conveyor 302 via second opening 218 and onto the first end 822 of conveyor 804. The conveyor 804 can direct the OBS nodes 30 towards the second end 824 of the conveyor 804. The capture appliance 820 can hold the transfer system 200 in place during retrieval of the OBS units 30 from the transfer system 200.

Figure 12:
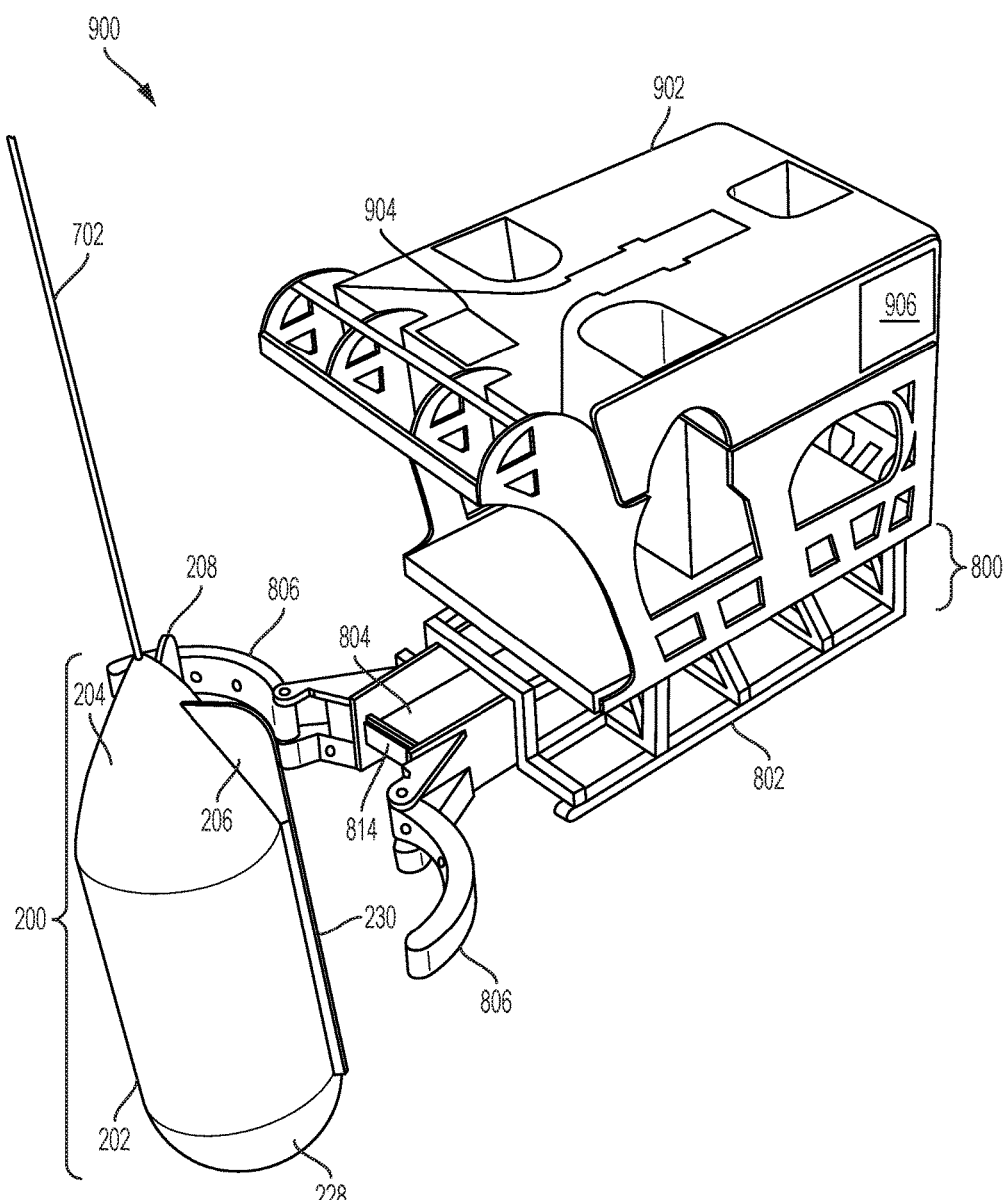
FIG. 12 illustrates a system to acquire seismic data from a seabed, in accordance with an embodiment.

FIG. 12 illustrates the system 900 to acquire seismic data from a seabed. The vehicle 902 can release the transfer system 200. The vehicle 902 can release the transfer system 200 and move away from the transfer system 200. The vehicle 902 can move above and away from the transfer system 200, down and away from the transfer system 200, or horizontally away from the transfer system 200. In some embodiments, the vehicle 902 can release the transfer system 200 responsive to a failure condition, error, power failure, component failure, or other condition or event that triggers a release procedure of the capture appliance 820 or default position of the capture appliance 820.

Figure 13:
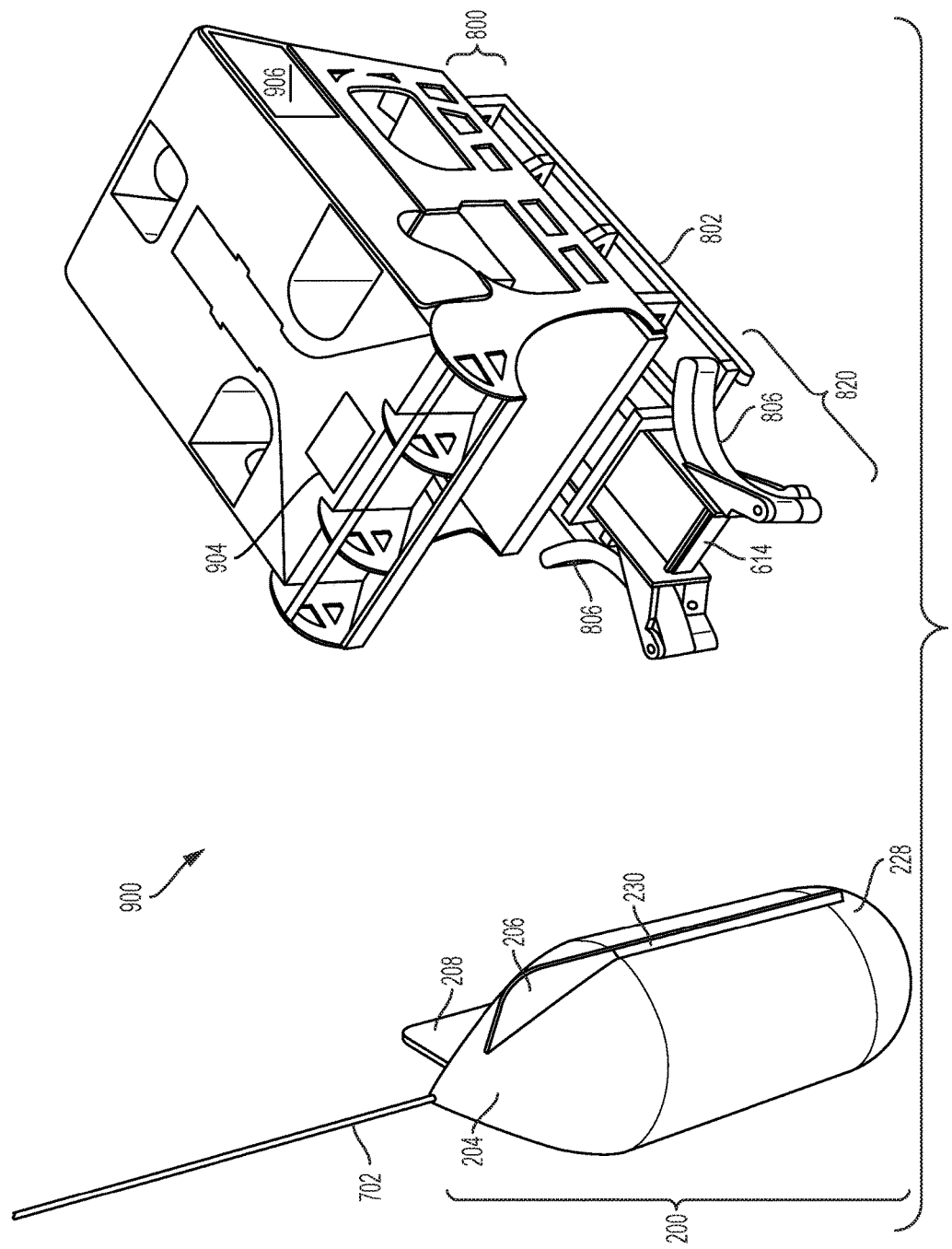
FIG. 13 illustrates a system to acquire seismic data from a seabed, in accordance with an embodiment.

FIG. 13 illustrates the system 900 to acquire seismic data from a seabed. The capture appliance 820 can be in an open position or default position where the arms 806 are locked or maintained in an open position. The arms 806 can be temporarily connected to a portion of the conveyor 804 or frame 802 via a latch or other connecting mechanism. The transfer system 200 can be retrieved by raised by crane 614 to the vessel 620, and unloaded via conveyor 616 and elevator 618 to retrieve seismic data recorded on the OBS nodes 30.

FIG. 14 illustrates the system 900 to acquire seismic data from a seabed. The vehicle 902 can retrieve nodes from a bottom opening of the transfer system 200 at a location in the water column or on the seabed. For example, the transfer system 200 (e.g., or 400) can be lowered by crane 614 to the seabed. The vehicle 902 can approach the transfer system 200, align the capture appliance with the transfer system, and lower itself to come into contact with the seabed such that the fins 206 align and enter the notches 806. The skid system 800 can then open a gate 226 on the transfer system 200, and initiate conveyor 804 to retrieve nodes 30 from the transfer system 200.

FIG. 15 illustrates the system 900 to acquire seismic data from a seabed. The conveyor 804 can retrieve nodes 30 from the transfer system 200. In some embodiments, open opening gate 226, the nodes 30 may slide down and out of the case 202 due to gravity and the helix structure provided within the case 202. The vehicle 902 can include a retrieval mechanism (e.g., similar to deployment appliance 816) to retrieve OBS units 30 from the seabed. The OBS units 30 can store, in memory, seismic data acquired from the seabed. The retrieval mechanism 816 can include one or more arms, robotic arms, suction cups, or ramps to retrieve the OBS unit from the seabed and position the OBS unit 30 onto the conveyor 804. In some embodiments, the retrieval mechanism may be a separate ROV or AUV configured to retrieve OBS units 30 and place them on conveyor 804.

Figure 16:
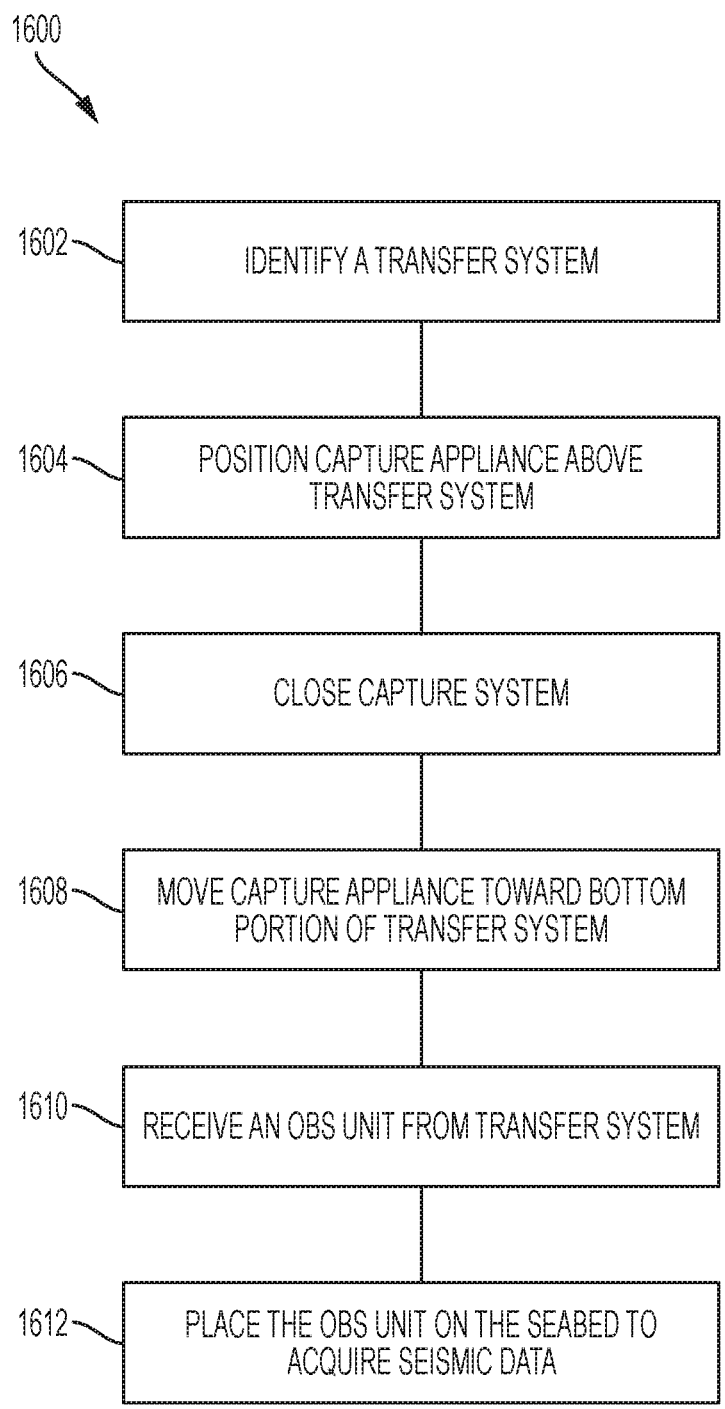
FIG. 16 is a flow diagram of an embodiment of a method of acquiring seismic data from a seabed.

FIG. 16 illustrates a flow diagram for a method of acquiring seismic data from a seabed. The method 1600 can include identifying a transfer system at act 1602. At act 1604, the method 1600 includes positioning a capture appliance above the transfer system. At act 1606, the method 1600 includes closing the capture system. At act 1608, the method 1600 includes moving the capture appliance towards a bottom portion of the transfer system. At act 1610, the method 1600 includes receiving an OBS unit from the transfer system. At act 1612, the method 1600 includes placing the OBS unit on the seabed to acquire seismic data.

The method 1600 can include identifying a transfer system at act 1602. For example, a sensor of an underwater vehicle such as an ROV or AUV can receive or detect a ping from a beacon of a transfer system. The sensor can convert the received ping (e.g., acoustic or optic) to an electrical signal, and transmit the electrical signal to a processor or communication device of the vehicle. The transfer system broadcasting the ping or beacon can include a case constructed to store one or more OBS units. The underwater vehicle can include a conveyor and an arm to capture and hold the case, and retrieve OBS nodes from the case.

At act 1604, the method 1600 includes positioning a capture appliance above the transfer system. The sensor of the vehicle can detect the ping from the beacon or transponder on the case, and use the ping to position the arm in the open state above the case. For example, the sensor can include multiple sensors used to triangulate the location of the beacon on the case broadcasting the ping. In some embodiments, the vehicle (or processor or controller thereof) can determine a depth of the underwater vehicle relative to the case based on the ping. For example, the vehicle can locate the beacon in three dimensions X, Y, and Z coordinates relative to the vehicle. The vehicle can determine an angular direction of the beacon based on the received ping.

Upon locating the case, the vehicle can move the capture appliance including the arm above a cap of the case. The vehicle can move the arm in the open state towards a cable connected to the cap of the case that supports the case in an aqueous medium. The capture appliance can be in an open state and at least partially surround the cable extending from the cap of the case to a crane on a vessel. The case can include a first portion that is hydrodynamic and a second portion configured to produce drag to prevent rotation of the case through an aqueous medium. The case can include a portion having a conical shape or a domed shape.

At act 1606, the method 1600 includes closing the capture system. For example, an actuator of the vehicle can close the arm or one or more arms to capture or hold the case in a relatively stable position.

At act 1608, the method 1600 includes moving the capture appliance towards a bottom portion of the transfer system. The vehicle can move the capture appliance to lock, in a notch of the arm, a runner or fin of the case to align the opening of the case with the conveyor. In some embodiments, the terms runner and fin can be used interchangeably. The bottom portion of the case can be below the cap. For example, the bottom portion of the case can refer to a top opening of the case used to load OBS units into the case, or a bottom opening of the case used to retrieve OBS units. The vehicle can align an opening of the case with a conveyor of the underwater vehicle. The vehicle can open a gate on the case that blocks the OBS unit from moving through the opening of the case. Blocking the OBS unit from moving through the opening can include or refer to restraining the OBS within the case, stopping the OBS from passing through the case, confining the OBS unit to the case, or obstructing the passage of the OBS unit.

At act 1610, the method 1600 includes receiving an OBS unit from the transfer system. The conveyor of the vehicle can receive, via the opening of the case, the OBS unit stored in the case or transported via the case. For example, the vehicle can run or turn on the conveyor to retrieve the OBS unit from the case.

The case can include a helix structure provided within the case that stores one or more OBS units. In some embodiments, the case can include multiple helix structures provided within the case to store multiple levels of OBS units. The OBS units can travel down the helix structure (e.g., via gravity or other means). As the vehicle retrieves OBS units, additional OBS units can travel down the helix structure behind the retrieved OBS units. For example, when the vehicle retrieves or removes a first OBS unit from the helix structure, second OBS unit behind the first OBS unit can also be retrieved in a train-like fashion, even though the OBS units are not connected or coupled to one another. Subsequent OBS units can travel down through the helix structure as each OBS unit is retrieved from the case. For example, a last OBS unit in the case can push the OBS unit in front of the last OBS unit. However, when there is only one remaining OBS unit, the conveyor of the vehicle can pull the last OBS unit out of the case because the last unit is not being pushed out by anything on the unpowered, gravity conveyor of the case.

At act 1612, the method 1600 includes placing the OBS unit on the seabed to acquire seismic data. The underwater vehicle can place the OBS unit on the seabed to acquire seismic data from the seabed. The underwater vehicle can initiate recording of the OBS unit responsive to or upon placing the OBS unit on the seabed. The OBS unit can be configured to record upon being loaded into the case on the vessel. The OBS unit can automatically begin recording upon detecting that it is placed on the seabed. The OBS unit can automatically begin recording upon detecting a condition or event, such as a temporal trigger, depth trigger, pressure trigger, temperature trigger, optical signal, or acoustic signal.

Figure 17:
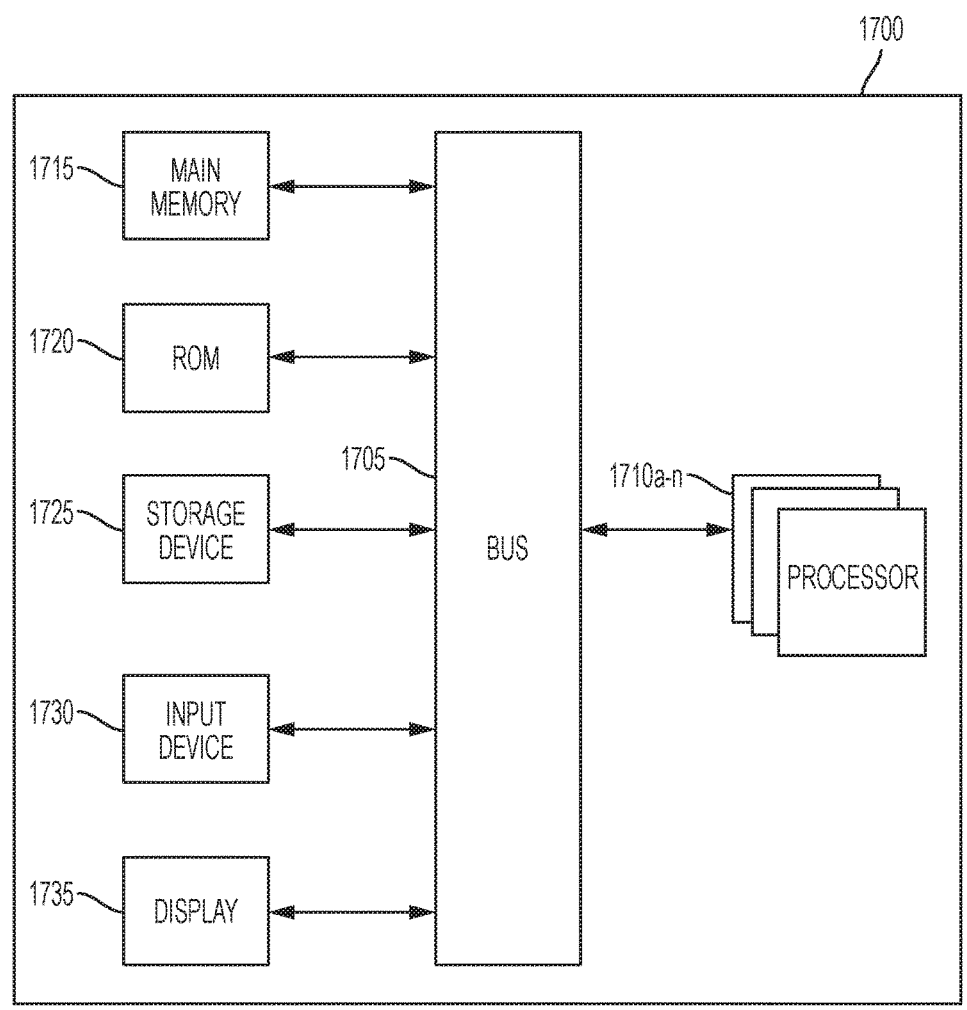
FIG. 17 is a block diagram illustrating a general architecture for a computer system that may be employed to implement various elements of the embodiments shown in FIGS. 1-16.

FIG. 17 is a block diagram of a computer system 1700 in accordance with an embodiment. The computer system or computing device 1700 can be used to implement one or more controller, sensor, interface or remote control of system 100, system 200, system 300, system 400, system 500, system 600, system 700, system 800, or system 900 or method 1600. The computing system 1700 includes a bus 1705 or other communication component for communicating information and a processor 1710a-n or processing circuit coupled to the bus 1705 for processing information. The computing system 1700 can also include one or more processors 1710 or processing circuits coupled to the bus for processing information. The computing system 1700 also includes main memory 1715, such as a random access memory (RAM) or other dynamic storage device, coupled to the bus 1705 for storing information, and instructions to be executed by the processor 1710. Main memory 1715 can also be used for storing seismic data, binning function data, images, reports, tuning parameters, executable code, temporary variables, or other intermediate information during execution of instructions by the processor 1710. The computing system 1700 may further include a read only memory (ROM) 1720 or other static storage device coupled to the bus 1705 for storing static information and instructions for the processor 1710. A storage device 1725, such as a solid state device, magnetic disk or optical disk, is coupled to the bus 1705 for persistently storing information and instructions.

The computing system 1700 may be coupled via the bus 1705 to a display 1735 or display device, such as a liquid crystal display, or active matrix display, for displaying information to a user. An input device 1730, such as a keyboard including alphanumeric and other keys, may be coupled to the bus 1705 for communicating information and command selections to the processor 1710. The input device 1730 can include a touch screen display 1735. The input device 1730 can also include a cursor control, such as a mouse, a trackball, or cursor direction keys, for communicating direction information and command selections to the processor 1710 and for controlling cursor movement on the display 1735.

The processes, systems and methods described herein can be implemented by the computing system 1700 in response to the processor 1710 executing an arrangement of instructions contained in main memory 1715. Such instructions can be read into main memory 1715 from another computer-readable medium, such as the storage device 1725. Execution of the arrangement of instructions contained in main memory 1715 causes the computing system 1700 to perform the illustrative processes described herein. One or more processors in a multi-processing arrangement may also be employed to execute the instructions contained in main memory 1715. In some embodiments, hard-wired circuitry may be used in place of or in combination with software instructions to effect illustrative implementations. Thus, embodiments are not limited to any specific combination of hardware circuitry and software.

Although an example computing system has been described in FIG. 17, embodiments of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources. The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a personal digital assistant (PDA), a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While various inventive embodiments have been described and illustrated herein, those of ordinary skill in the art will readily envision a variety of other means or structures for performing the function or obtaining the results or one or more of the advantages described herein, and each of such variations or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, or configurations will depend upon the specific application or applications for which the inventive teachings are used. The foregoing embodiments are presented by way of example, and within the scope of the appended claims and equivalents thereto other embodiments may be practiced otherwise than as specifically described and claimed. The systems and methods described herein are directed to each individual feature, system, article, material, or kit, described herein. In addition, any combination of two or more such features, systems, articles, materials, kits, or methods, if such features, systems, articles, materials, kits, or methods are not mutually inconsistent, is included within the inventive scope of the present disclosure.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

A computer employed to implement at least a portion of the functionality described herein may comprise a memory, one or more processing units (also referred to herein simply as "processors"), one or more communication interfaces, one or more display units, and one or more user input devices. The memory may comprise any computer-readable media, and may store computer instructions (also referred to herein as "processor-executable instructions") for implementing the various functionalities described herein. The processing unit(s) may be used to execute the instructions. The communication interface(s) may be coupled to a wired or wireless network, bus, or other communication means and may therefore allow the computer to transmit communications to or receive communications from other devices. The display unit(s) may be provided, for example, to allow a user to view various information in connection with execution of the instructions. The user input device(s) may be provided, for example, to allow the user to make manual adjustments, make selections, enter data or various other information, or interact in any of a variety of manners with the processor during execution of the instructions.

The various methods or processes outlined herein may be coded as software that is executable on one or more processors that employ any one of a variety of operating systems or platforms. Additionally, such software may be written using any of a number of suitable programming languages or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the solution discussed above. The computer readable medium or media can be transportable, such that the program or programs stored thereon can be loaded onto one or more different computers or other processors to implement various aspects of the present solution as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present solution need not reside on a single computer or processor, but may be distributed in a modular fashion amongst a number of different computers or processors to implement various aspects of the present solution.

Computer-executable instructions may be in many forms, such as program modules, executed by one or more computers or other devices. Generally, program modules include routines, programs, objects, components, data structures, or other components that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein in the specification and in the claims, unless clearly indicated to the contrary, should be understood to mean "at least one." References to "or" may be construed as inclusive so that any terms described using "or" may indicate any of a single, more than one, and all of the described terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B,") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A system for acquiring seismic data from a seabed, comprising:
   a case having a cylindrical portion;
   a cap positioned adjacent to a first end of the case;
   a first conveyor having a first helix structure and provided within the case to receive an ocean bottom seismometer ("OBS") unit at a first end of the first conveyor and transport the OBS unit via the first helix structure to a second end of the first conveyor to provide the OBS unit on the seabed to acquire the seismic data, a first distance between the first end of the first conveyor and the cap less than a second distance between the second end of the first conveyor and the cap;
   a second conveyor having a second helix structure provided within the case, the second conveyor configured to support a second OBS unit; and
   a support structure configured to extend through a central axis of the first helix structure of the first conveyor and the second helix structure of the second conveyor.

2. The system of claim 1, wherein the case comprises:
   an opening to allow the OBS unit to pass through the case.

3. The system of claim 1, wherein the case comprises:
   a first opening to receive the OBS unit at the first end of the first conveyor; and
   a second opening to remove the OBS unit from the second end of the first conveyor.

4. The system of claim 1, wherein the case comprises:
   a first opening configured to receive the OBS unit at the first end of the first conveyor;
   a first gate configured to close the first opening;
   a second opening to remove the OBS unit from the second end of the first conveyor; and
   a second gate configured to obstruct the second opening.

5. The system of claim 4, wherein at least one of the first gate or the second gate are under mechanical tension.

6. The system of claim 4, wherein at least one of the first gate or the second gate are configured to open and closed along a vertical axis of the cylindrical portion.

7. The system of claim 1, wherein the cap comprises a conical shape, and a base of the cap is coupled to the first end of the case.

8. The system of claim 1, comprising:
   the first conveyor including the first helix structure with a center of the first helix structure extending along an axis of the cylindrical portion of the case.

9. The system of claim 1, wherein the first conveyor comprises a plurality of portions coupled together to form the first helix structure.

10. The system of claim 1, comprising:
    the first helix structure having a spiral pitch.

11. The system of claim 1, comprising:
    a first fin extending from at least one of the cap or the case; and
    a second fin extending from at least one of the cap or the case, the first fin separated from the second fin by a predetermined angle to control rotation of the case through an aqueous medium.

12. The system of claim 11, comprising:
    the first fin separated from the second fin by the predetermined angle to dampen rotation of the case when moved through the aqueous medium.

13. The system of claim 11, wherein the first fin and the second fin are positioned to generate drag in the aqueous medium to control the rotation of the case.

14. The system of claim 11, wherein the predetermined angle is between 70 and 110 degrees.

15. The system of claim 1, wherein the case comprises one or more openings to allow one or more OBS units to pass through the case and onto at least one of the first conveyor or the second conveyor.

16. The system of claim 1, wherein a third distance between a first end of the second conveyor and the cap is greater than the first distance, and a fourth distance between a second end of the second conveyor and the cap is greater than the second distance; and wherein the first helix structure and the second helix structure comprise a same constant spiral pitch.

17. The system of claim 1, comprising:
a second cap coupled to a second end of the case opposite from the first end, the second cap comprising a ballast.

18. The system of claim 1, comprising:
the support structure coupled to at least one of a first interior portion of the cap or a second interior portion of a second cap, the support structure configured to support the first conveyor.

19. The system of claim 1, comprising:
a runner protruding from, and extending along, a longitudinal axis of the cylindrical portion of the case.

20. The system of claim 1, comprising:
a beacon positioned on the cap, the beacon comprising at least one of an acoustic transponder or a light source.

21. The system of claim 1, wherein the first conveyor comprises an unpowered gravity conveyor.

22. The system of claim 1, wherein the first conveyor provides the OBS unit to an underwater vehicle comprising:
a capture appliance to receive the OBS unit via an opening at the second end of the first conveyor; and
a deployment device to place the OBS unit on the seabed to acquire the seismic data.

23. A system for acquiring seismic data from a seabed, comprising:
a case having a first portion that is hydrodynamic and a second portion to produce drag;
a first conveyor having a first helix structure and provided within the case, the first conveyor positioned to receive an ocean bottom seismometer ("OBS") unit at a first end of the first conveyor and transport the OBS unit via the first helix structure to a second end of the first conveyor;
a second conveyor having a second helix structure provided within the case, the second conveyor configured to support a second OBS unit; and
a support structure configured to extend through a central axis of the first helix structure of the first conveyor and the second helix structure of the second conveyor.

24. The system of claim 23, wherein the case comprises:
a first opening configured to receive the OBS unit at the first end of the first conveyor; and
a second opening to remove the OBS unit from the second end of the first conveyor, a first distance between the first opening and a cap of the case less than a second distance between the second opening and the cap.

25. The system of claim 23, wherein the first conveyor comprises a gravity conveyor that is unpowered.

26. A system for acquiring seismic data from a seabed, comprising:
a case having a cylindrical portion;
a cap positioned adjacent to a first end of the case;
a first conveyor having a first helix structure and provided within the case, the first conveyor configured to receive an ocean bottom seismometer ("OBS") unit at a first end of the first conveyor and transport the OBS unit via the first helix structure to a second end of the first conveyor;
an underwater vehicle comprising a capture appliance to receive the OBS unit via an opening at the second end of the first conveyor;
a deployment device of the underwater vehicle to place the OBS unit on the seabed to acquire the seismic data;
a second conveyor having a second helix structure provided within the case, the second conveyor configured to support a second OBS unit; and
a support structure configured to extend through a central axis of the first helix structure of the first conveyor and the second helix structure of the second conveyor.

27. The system of claim 26, comprising:
the underwater vehicle configured to retrieve the OBS unit from the seabed.

28. The system of claim 26, comprising:
a first fin extending from at least one of the cap or the case; and
a second fin extending from at least one of the cap or the case, the first fin separated from the second fin by a predetermined angle to control rotation of the case through an aqueous medium.

29. The system of claim 28, wherein the first fin and the second fin are configured to generate drag in the aqueous medium to control the rotation of the case.

30. A system for acquiring seismic data from a seabed, comprising:
a case having a cylindrical portion and one or more openings;
a cap positioned adjacent to a first end of the case;
a first conveyor having a first helix structure and provided within the case, the first conveyor configured to receive one or more ocean bottom seismometer ("OBS") units at a first end of the first conveyor and transport the one or more OBS units via the first helix structure to a second end of the first conveyor;
a second conveyor having a second helix structure provided within the case, the second conveyor configured to support a second OBS unit;
a support structure configured to extend through a central axis of the first helix structure of the first conveyor and the second helix structure of the second conveyor;
an underwater vehicle comprising a retrieval device to retrieve an OBS unit connected to the seabed, the OBS unit storing seismic data acquired via the seabed; and
the underwater vehicle comprising a third conveyor to transfer the OBS unit retrieved from the seabed to the first conveyor in the case via the one or more openings of the case.

31. The system of claim 30, wherein the OBS unit is a first OBS unit, comprising:
the retrieval device configured to retrieve a second OBS unit connected to the seabed;
the third conveyor configured to transfer the second OBS unit retrieved from the seabed to the second conveyor in the case via the one or more openings of the case.

32. The system of claim 30, comprising:
a first fin extending from at least one of the cap or the case; and
a second fin extending from at least one of the cap or the case, the first fin separated from the second fin by a predetermined angle to control rotation of the case through an aqueous medium.

* * * * *